United States Patent [19]

Shimizu

[11] Patent Number: 5,621,587
[45] Date of Patent: Apr. 15, 1997

[54] TAPE DRIVE MECHANISM HAVING A MODE CAM OPERATED BY REVERSE ROTATION OF MOTOR

[75] Inventor: Kunio Shimizu, Chiba, Japan

[73] Assignee: Sony Corporation, Tokyo, Japan

[21] Appl. No.: 409,881

[22] Filed: Mar. 21, 1995

Related U.S. Application Data

[63] Continuation of Ser. No. 66,036, filed as PCT/JP92/01284, Oct. 5, 1992, abandoned.

[30] Foreign Application Priority Data

Oct. 4, 1991 [JP] Japan .................................. 3-283718

[51] Int. Cl.⁶ ................................................ G11B 5/008
[52] U.S. Cl. .............................. 360/96.3; 360/137
[58] Field of Search .............................. 360/96.3, 96.2, 360/96.1, 90, 137

[56] References Cited

U.S. PATENT DOCUMENTS

| | | | |
|---|---|---|---|
| 4,723,236 | 2/1988 | Kitami | 360/96.3 |
| 4,956,734 | 9/1990 | Kamijo | 360/137 |
| 5,005,094 | 4/1991 | Komatsu et al. | 360/96.3 |
| 5,062,013 | 10/1991 | Gotoh | 360/96.3 |
| 5,184,262 | 2/1993 | Watanabe et al. | 360/137 |

FOREIGN PATENT DOCUMENTS 6161457  12/1986  Japan .

Primary Examiner—Robert S. Tupper
Assistant Examiner—William R. Korzuch
Attorney, Agent, or Firm—Limbach & Limbach L.L.P.

[57] ABSTRACT

The tape drive unit of the present invention is constructed such that the reverse rotation of a motor (16) causes a mode cam (32) to drive for setting any mode of normal play, reverse play, fast forward and rewinding, and thereafter the forward rotation of the motor (16) causes a reel shaft (3) or a reel shaft (4) to rotationally drive according to said mode and a head base (51) is slid upon FWD/REV to set up a magnetic head and pinch rollers. With such construction, each operation of normal play, reverse play, fast forward and rewinding can be performed without using a plunger or microcomputer, thereby eliminating the fear of troubles due to the plunger malfunction or a microcomputer bug.

3 Claims, 22 Drawing Sheets

TAPE DRIVE MECHANISM HAVING A MODE CAM OPERATED BY REVERSE ROTATION OF MOTOR

This is a continuation of application Ser. No. 08/066,036, filed as PCT/JP92/01284 on Oct. 5, 1992, now abandoned.

TECHNICAL FIELD

The present invention is related to a tape drive unit which is suitably used, for instance, in a portable compact cassette player.

BACKGROUND ART

At present, cassette players usually have respective operational functions: normal running (will hereinafter be described as FWD), reverse running (will hereinafter be described as REV), fast running (will hereinafter be described as FF), and rewind (hereinafter described as REW) of a tape.

In tape drive units which have been employed in such kinds of cassette players, there was proposed one which is provided with a cam gear having a cam face formed on its principal plane side, thereby for selectively switching the operation modes such as FWD, REV, FF, REW modes and so on.

In such tape drive unit, when the above-mentioned cam gear is rotated, a mode switching mechanism for switching to each operation mode is operated by means of the above-mentioned cam face. The rotational angle position of the cam gear and said each operation mode are made to correspond to each other. That is, by rotating the cam gear by a motor or the like and stopping it at a predetermined rotational angle for positioning, a predetermined operation mode is selected.

For instance, in the tape drive unit having a mode switching mechanism of a reverse-type recording/reproducing device, which is proposed in Japanese laid-open patent publication No. 62-163353 by the applicant of this case, the driving force of a single drive motor rotates and operates a pair of capstans for allowing a tape to travel to the FWD and REV sides, a reel shaft on which a tape reel is mounted for taking up the tape that was made to travel, and a cam gear for selectively switching a plurality of operation modes, respectively. That is, the driving force of the drive motor is transmitted to the capstans, reel shaft, etc. through a driving force transmission mechanism comprising a driving belt, gear and the like.

The cam gear has a gear portion having a plurality of tooth lacking portions formed on the outer periphery thereof, and has a predetermined cam face and a portion to be engaged which is protrusively provided on the major surface thereof. The cam gear is positioned through engagement of the portion to be engaged by a cam gear engaging member at a rotational angle position, at which the drive gear which transmits the driving force of the drive motor corresponds to the tooth lacking portions. The cam gear engaging member is constructed to be reciprocated by a plunger and an activating spring.

When the cam gear rotates, a mode switching mechanism for switching the operation mode is operated by the cam face. The mode switching mechanism is formed such that a predetermined operation mode can be selected by switching the transmission path of the driving force through an operation of moving the shaft of a gear for transmitting the driving force of the drive motor and by switching the travel direction of the tape through selectively pressing a pinch roller against the pair of capstans or the like.

That is, in the tape drive unit, to switch the operation mode, the plunger is actuated to release the engagement with the cam gear and engage the drive gear with the gear portion, thereby rotating the cam gear. Whereupon, the mode switching mechanism is operated and the tape traveling direction and the like are switched. The mode switching mechanism is operated according to the rotational angle position of the cam gear for switching to a predetermined mode corresponding to the rotational angle position. Accordingly, when the operation mode has been changed to a desired one, the desired operation mode is selected by releasing the actuation of the plunger and engaging and positioning the cam gear by the cam gear engaging member.

However, since the plunger has been required in the prior art as described above, there is a disadvantage that the cost will increase accordingly, and timing is important for the plunger trigger operation, in which a malfunction tends to occur, and the plunger itself is a part which easily malfunctions by the influence of dust and the like. In addition, a microcomputer is needed because of complicated control, which also leads to an increase in the cost, and malfunction also tends to occur due to bugs in the microcomputer. Moreover, there are various problems such as the need for care for resetting after battery replacement because of the electrical mode control, the difficulty of understanding the operation and the difficulty of service due to microcomputer control, and the like.

This invention was accomplished in view of such points, and the object of which is to provide a tape drive unit that requires no plunger and microcomputer thereby solving the above problems.

DISCLOSURE OF THE INVENTION

A first present invention comprises a motor which is forwardly and reversely rotatable, a pair of reel shafts for driving a tape reel having a magnetic tape wound thereon, mode setting means driven by the reverse rotation of the motor for forming the respective modes which set the tape traveling direction and tape traveling speed, and driving means driven by the forward rotation of the motor for driving the reel shafts according to the mode formed by the mode setting means, wherein after setting a mode by the reverse rotation of the motor, the reel shafts are driven by the forward rotation of the motor according to the mode that was set above.

In a second present invention, the setting means in the tape drive unit of the first present invention comprises a mode cam member driven by the reverse rotation of the motor, a first switch mechanism moved by the mode cam member for switching the tape traveling direction, and a second switch mechanism moved by the mode cam member for switching the tape traveling speed.

In a third present invention, the setting means in the second present invention comprises detecting means for detecting the positional state of the mode cam member.

In a fourth present invention, the driving means in the tape drive unit of the first present invention comprises a first transmission mechanism for transmitting the rotational driving force of the motor to either of the pair of reel shafts, and a second transmission mechanism for transmission to the other reel shaft, wherein the rotational driving force of the motor is selectively transmitted to the pair of reel shafts pursuant to the mode set by the mode setting means.

A fifth present invention comprises a motor which is forwardly and reversely rotatable, a pair of reel shafts for driving a magnetic tape, a magnetic head which is provided movably between a first position at which it can record on and/or reproduce from the magnetic tape and a second position at which it does not abut on the magnetic tape, a pair of capstans, a pair of pinch rollers corresponding to the pair of capstans, respectively, mode setting means driven by the reverse rotation of the motor for forming the respective modes for setting the tape traveling direction and the tape traveling speed, moving means driven by the forward rotation of the motor for moving the magnetic head according to the mode formed by the mode setting means to the first position at which the magnetic head can record on and/or reproduce from the magnetic tape, switch means driven by the forward rotation of the motor for selectively moving the pair of pinch rollers to cause them to abut on the capstans according to the mode formed by the mode setting means, and driving means driven by the forward rotation of the motor for driving the reel shafts according to the mode formed by the mode setting means, wherein after the mode is set by the reverse rotation of the motor, movement of the magnetic head, switching of the pinch rollers, and driving of the reel shafts are carried out by the forward rotation of the motor according to the set mode.

In a sixth present invention, the setting means in the tape drive unit of the fifth present invention comprises a mode cam meter driven by the reverse rotation of the motor, a first switch mechanism moved by the mode cam member for switching the tape traveling direction, and a second switch mechanism moved by the mode cam member for switching the tape traveling speed.

In a seventh present invention, the driving means in the tape drive unit of the fifth present invention comprises a first transmission mechanism for transmitting the rotational driving force of the motor to either of the pair of reel shafts, and a second transmission mechanism for transmitting the rotational driving force of the motor to the other reel shaft, whereby selectively transmitting the rotational driving force of the motor to the pair of reel shafts according to the mode set by the mode setting means.

Also, in an eighth present invention, the capstans of the fifth present invention are rotationally driven by the motor.

BEST MODE FOR CARRYING OUT THE INVENTION

Shown in this example is a tape drive unit for use with a portable compact cassette player including the respective operation functions of FWD, REV, FF and REW.

First, with reference to FIG. 1 the construction of the top side of a tape drive unit according to the present invention will be described.

Figure 1:
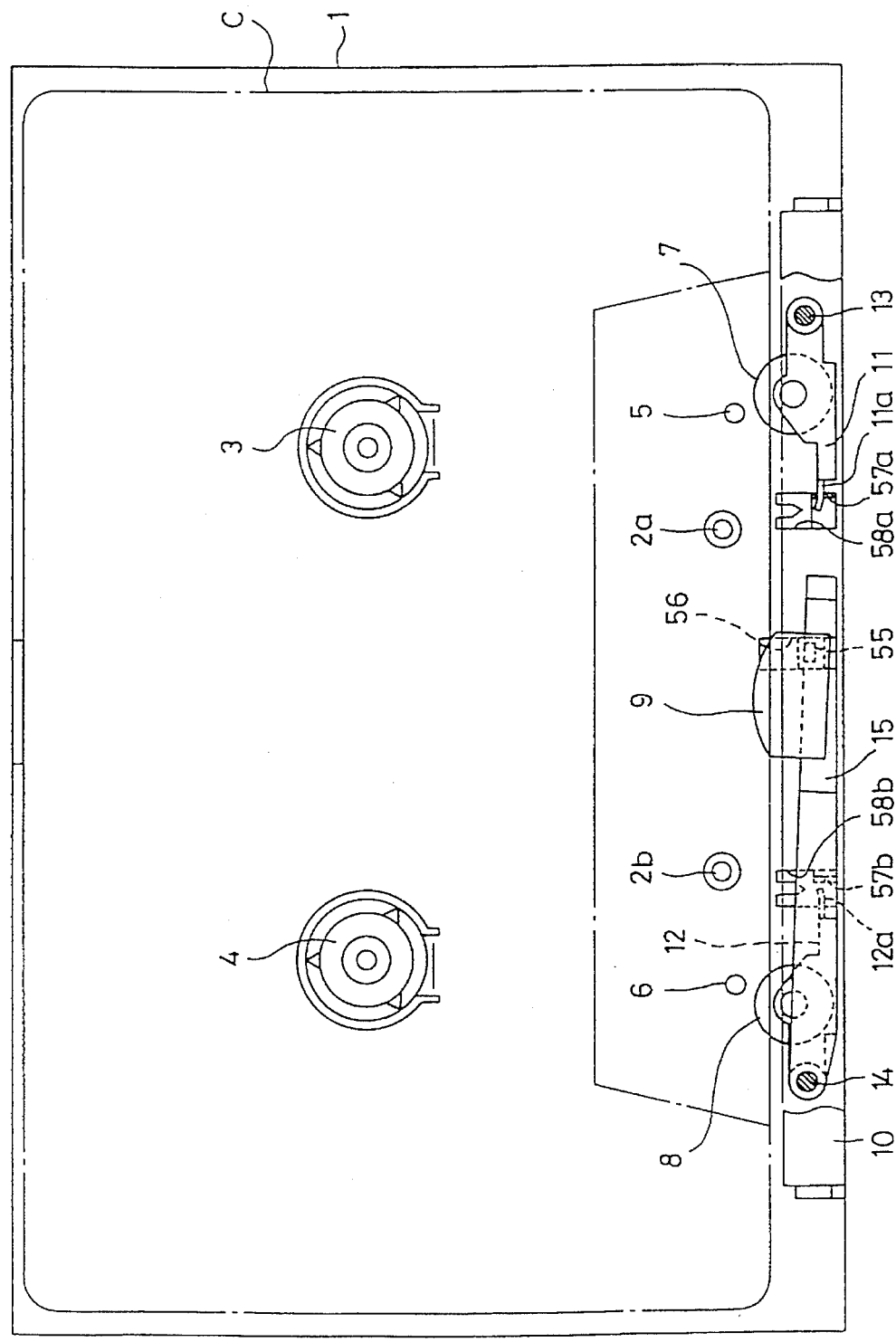
FIG. 1 is a plan view of the top side (the side on which a cassette is mounted) of an embodiment unit.

FIG. 1 shows a mechanical chassis (will hereinafter simply referred to as a chassis), and the top side of the chassis 1 is provided with a cassette mount portion on which a tape cassette C is mounted. 2a and 2b are reference pins for positioning tape cassette C. 3 is a take-up reel shaft to be engaged with the take-up reel of the tape cassette C, 4 is a supply reel shaft to be engaged with the supply reel of tape cassette, 5 is a first capstan for a FWD operation of the tape, and 6 is a second capstan for a REV operation of the tape. Further, 7 is a first pinch roller provided correspondingly to the first capstan 5, 8 is a second pinch roller provided correspondingly to the second capstan 6, and 9 is a magnetic head for reproducing the signal recorded on the tape. These first and second pinch rollers 7 and 8 and the magnetic head 9 are movably supported on a supporting plate 10, which is fixed to the front edge portion of the chassis 1 correspondingly to the front opening portion of the tape cassette C. On the supporting plate 10 at its left and right, a first pinch roller arm 11 and a second pinch roller arm 12 are symmetrically journaled by pivots 13 and 14, respectively, and the first and second pinch rollers 7 and 8 are pivotally supported by the first and second pinch roller arms 11 and 12, respectively. Further, on the supporting plate 10, a head arm 15 is pivotally supported coaxially with the second pinch roller arm 12, and the magnetic head 9 is fixed on the head arm 15. By a setup mechanism that will be described later on, the first and second pinch rollers 7 and 8 alternately press against the first and second capstans 5 and 6, respectively, with the tape being pinched therebetween, and the magnetic head 9 is set up so as to be pressed in contact with the tape.

Figure 2:
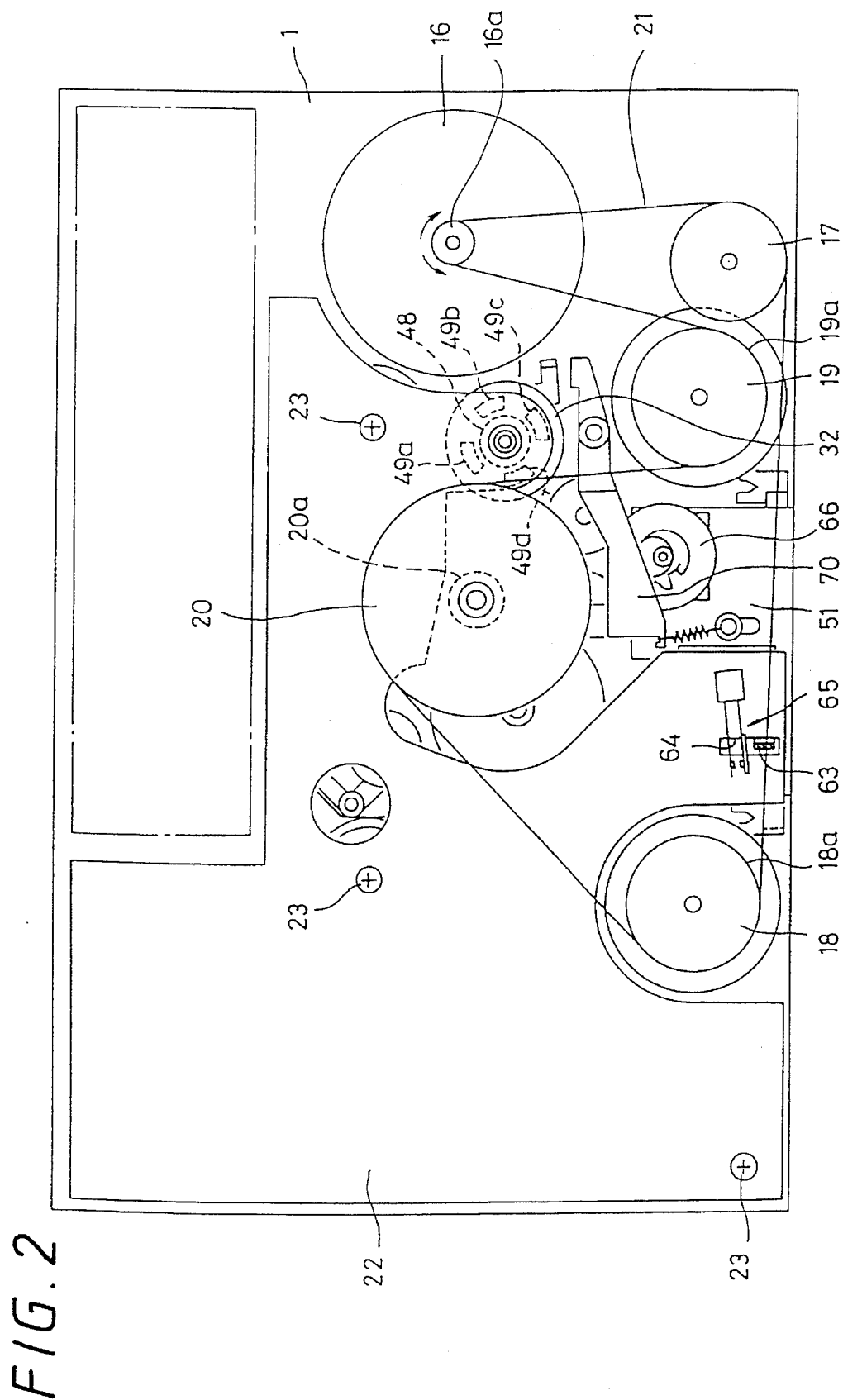
FIG. 2 is a plan view of the bottom side (the mechanism section side) of the embodiment unit.

Now, the construction of the bottom side of the tape drive unit of this example will be described with reference to FIG. 2.

In the figure, 16 is a motor as a drive source, 17 is a pulley, 18 and 19 are fly wheels which are rotated in unison with the first and second capstans 5 and 6, respectively, 20 is a main pulley, and a belt 21 is stretched over driving pulley 16a attached to the driving shaft of the motor 16, pulley 17, pulley 18a formed on the fly wheel 18, the main pulley 20, and the pulley 19a formed on the fly wheel 19. The motor 16 can rotate in both a forward direction (in the figure of this example, clockwise direction) and a reverse direction (counterclockwise direction). The fly wheels 18 and 19 and the main pulley 20 are rotated by the driving of the motor 16 through the belt 21. By the rotation of the fly wheels 18 and 19, the first and second capstans 5 and 6 are rotated in unison with them, and by the rotation of the main pulley 20, the driving of the reel shafts 3 and 4 and other various operations are performed. Arranged and disposed around the main pulley 20 are structural parts for setting the operation modes of FWD, REV, FF and REW, and for driving the reel shafts 3 and 4 and other members accordingly, and the circuit board 22 is fixed to the chassis 1 by means of screws 23 so as to cover most of the structural parts.

Figure 3:
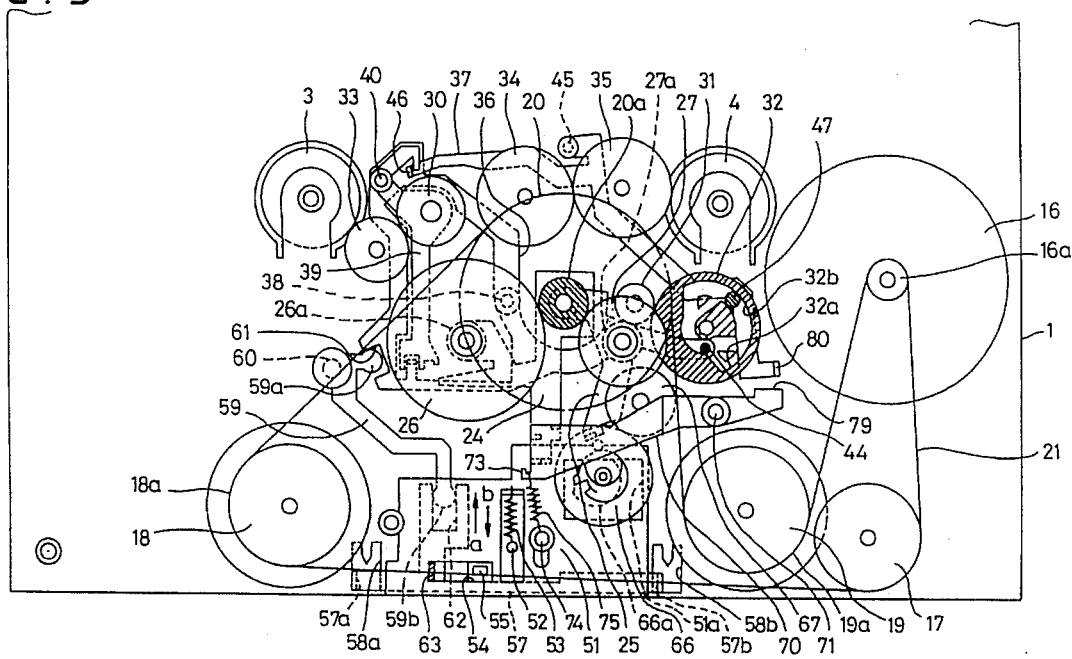
FIG. 3 is a plan view of the bottom side (the mechanism section side) of the embodiment unit, with a circuit board being removed.

FIG. 3 shows a state in which the circuit board 22 has been removed.

The following references were made to spatial relationships between parts shown in FIG. 3 refer to how these parts are arranged relative to one another as viewed from below. For example, "underneath" refers to a part that is under another part in this figure, but is actually above that part when viewed from the top of chassis 1.

Under the main pulley 20, first swing arm 24 and second switch arm 25 are journaled for free swing coaxially with the main pulley 20, and first and second slide gears 26 and 27 are pivotally supported on the first and second swing arms 24 and 25, respectively. The first and second slide gears 26 and 27 are respectively meshed with a small-diameter gear 20a which is integrally formed on the underside of the main pulley 26, and are always rotated with the main pulley 20. The first and second slide gears 26 and 27 have small-diameter gears 26a and 27a integrally formed on the underside thereof, respectively, and a torque limiter mechanism (slip mechanism) is contained between the first slide gear 26 and its small-diameter gear 26a, though not shown. Respectively attached to the first and second slide gears 26 and 27 are friction bodies 28 and 29 (shown in FIG. 9) made of an elastic material on both sides thereof, and they are in contact with the underside of the main pulley 20 with slight friction, respectively. For this, when the motor 16 is driven to rotate the main pulley 20, the friction by the friction bodies 28 and 29 allows the first and second slide gears 26 and 27 to be moved in the same direction as the rotational direction of the main pulley 20, respectively, when the first and second swing arms 24 and 25 swing.

When the motor 16 is rotated in the forward direction, the first slide gear 26 is meshed with a switch gear 30 to transmit its rotation to take-up reel shaft 3 or supply reel shaft 4, while when the motor 16 is rotated in the reverse direction, the small diameter gear 27a or second slide gear 27 is meshed with a transmission gear 31 to transmit is rotation to a mode cam 32.

The switch gear 30, which is moved by a mode setting mechanism that will be described later on, meshes with a transmission gear 33 upon FWD and FF to transmit its rotation to the take-up reel shaft 3, and meshes with a transmission gear 34 for REV and REW to transmit its rotation to the supply reel shaft 4 through a transmission gear 35.

On the other hand, the mode cam 32 acts to cause the mode setting mechanism to move the position of the switch gear 30 for setting to each mode of FWD, REV, FF and REW.

Figure 4A:
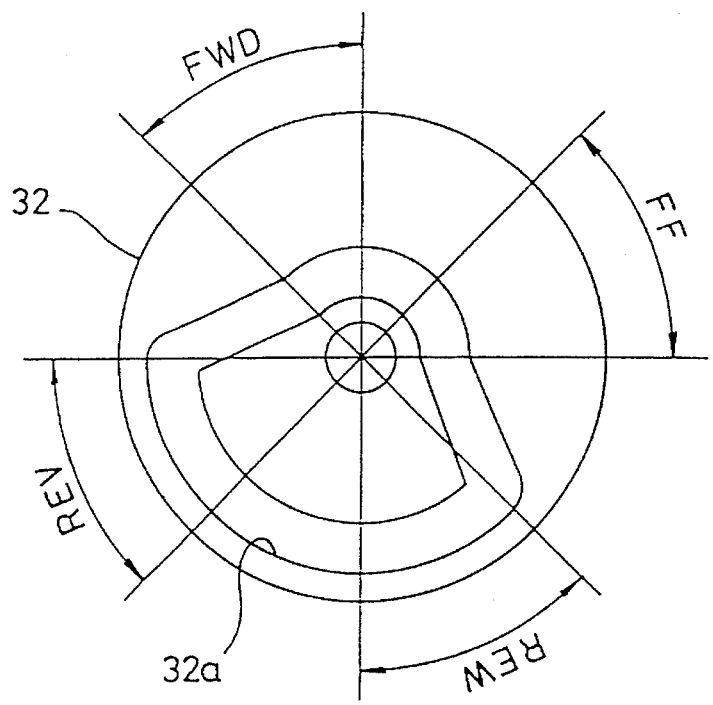
FIG. 4A is an explanatory view of the direction changing cam groove of the mode cam.
Figure 4B:
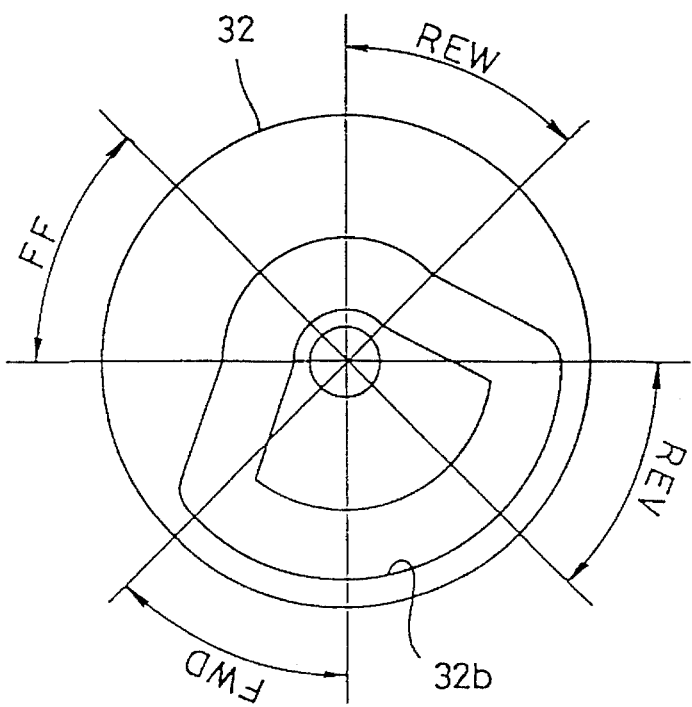
FIG. 4B is an explanatory view of the speed changing cam groove of the mode cam.

The mode cam 32 is a so-called double cam. That is, a first cam groove 32a is formed in the deep portion of the cam, and a second cam groove 32b having a different groove width is formed in the shallow portion so as to partially overlap the first cam groove 32a. The first and second cam grooves 32a and 32b have the groove shapes as shown in FIGS. 4A and 4B, respectively, and the portions used for setting the respective FWD, REV, REW and FF modes are continuously formed.

Figure 7:
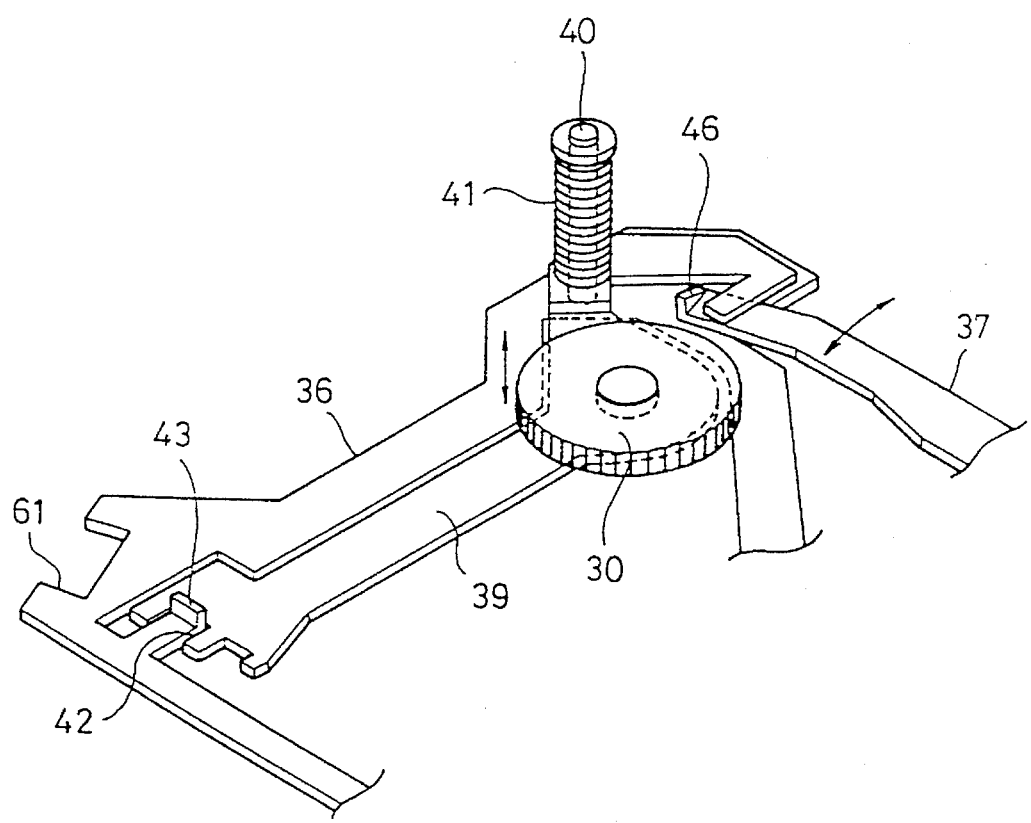
FIG. 7 is a perspective view of a main portion of a mode setting mechanism.

The mode setting mechanism actuated by the mode cam 32 comprises a first switch lever 36 and a second switch lever 37. The first switch lever 36, which is pivotally mounted for swing on the chassis 1 by means of a pivot 38, has a lift lever 39 attached to a portion thereof, and the switch gear 30 is pivotally supported on the lift lever 39. That is, as apparent from FIG. 7, the lift lever 39 having the switch gear 30 is pivotally supported on a support stem 40 which is provided upright on the first switch lever 36 and is supported in parallel with the first switch lever 36 for rise or fall, and the lift lever 39 is downwardly pressed and biased by the force of a spring 41 fitted over the support stem 40. The lift lever 39 has at one end thereof a recess 42, which is engaged with a hook-like guide piece 43 protrusively provided on the first switch lever 36, whereby the lift lever 39 is constantly allowed to rise or fall at a fixed position without swinging relative to the first switch lever 36. In addition, the lift lever 39 is operated to rise or fall by the second switch lever 37 as will be described later. A part of the first switch lever 36 is extended in the direction to the mode cam 32 and the engaging pin 44 provided upright on the end of that part engages with the first cam groove 32a of the mode cam 32, wherein the first switch lever 36 is rotated about the pivot 38 when the mode cam 32 is rotated, and the switch gear 30 moves between the transmission gear 33 on the take-up reel shaft 3 side and the transmission gear 34 on the supply reel shaft 4 side to perform the mode switching operation for FWD/FF and REV/REW.

On the other hand, the second switch lever 37 is pivotally mounted for swing on the chassis 1 by means of a pivot 45, and one end of which corresponds to a part of the lift lever 39 on the first switch lever 36. A projecting piece 46 is formed on the distal end of the second switch lever 37 corresponding to the lift lever 39, as seen from FIG. 7, and the upper surface of the projecting piece 46 is in the shape of a wedge sloped in the swing direction of the second switch lever 37. A part of the second switch lever 37 is extended in the direction to the mode cam 32, and an engaging pin 47 provided upright on the extended portion is engaged with the second cam groove 32b of the mode cam 32, wherein upon rotation of the mode cam 32, the second switch lever 37 is rotated about the pivot 45 and the end portion of second switch lever comes under the lift lever 39, the ramp surface of the projecting piece 46 pushes up the lift lever 39 against the force of the spring 41 to cause the switch gear 30 to rise, thereby performing the mode switching operation of FWD/REV and FF/REW.

Figure 5:
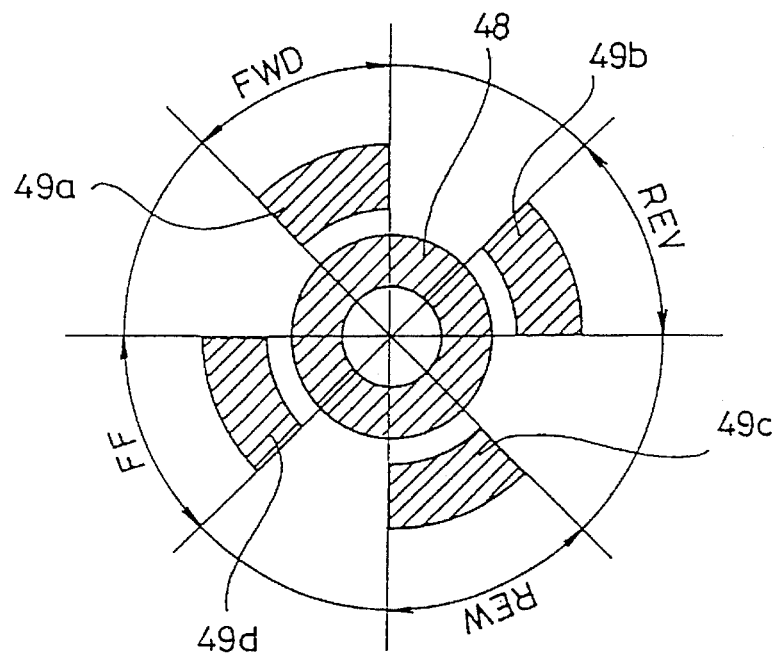
FIG. 5 is an explanatory view of an electro-mechanical contact for detecting a rotational position of the mode cam.
Figure 6:
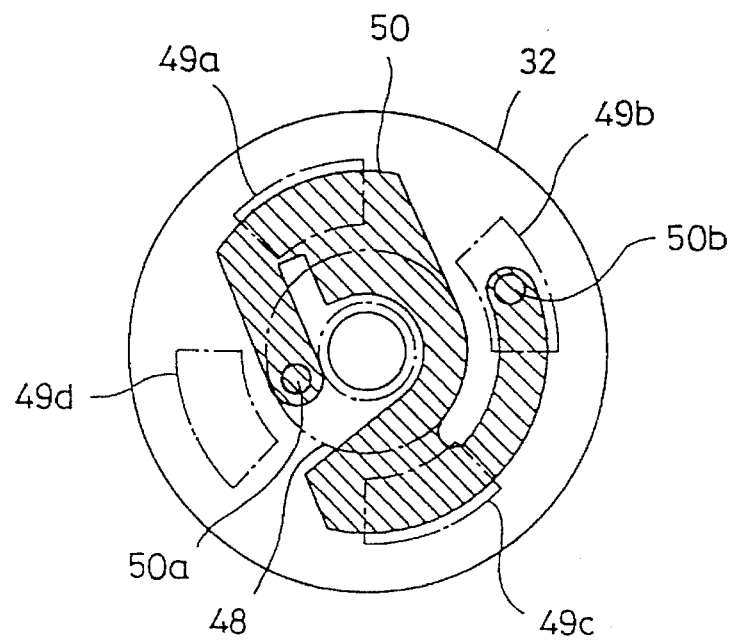
FIG. 6 is an explanatory view of the means for detecting a rotational position of the mode cam.

As described above, the setting operations of the respective modes by the rotation of the mode cam 32 are distributed to rotation ranges of 90°, respectively, and detection of the position (mode) is performed by the output of an electrical contact. That is, in the rear side of the circuit board 22, in the portion corresponding to the mode cam 32, as shown in FIG. 5, a central annular contact 48 is formed and four contacts 49a, 49b, 49c and 49d corresponding to FWD, REV, REW and FF are formed outside the annular contact 48. The four contacts 49a, 49b, 49c and 49d are angularly spaced from each other by 90° and formed in a range of 45°, respectively, and the individual contacts 49a to 49d and the annular contact 48 are connected to the operation circuit formed on the circuit board 22. On the other hand, on the upper side of the mode cam 32, a conductive plate 50 is attached so as to rotate in harmony, as shown in FIG. 6. The conductive plate 50 has two terminals 50a and 50b, and one terminal 50a is slidably in contact with the annular contact 48, while other terminal 50b is slidably in contact with any one of the four contacts 49a to 49d according to the rotational position of the mode cam 32. In the operation circuit, detection of the rotational position (mode) is performed according to which one of the four contacts 49a to 49d is in contact with the terminal 50b of the conductive plate 50.

Further on the chassis 1, a setup mechanism is constructed for performing the setup of the pinch rollers 7 and 8 and magnetic head 9 upon FWD and REV as shown in FIGS. 1 and 3.

First, between the fly wheels 18 and 19 on both sides, a head base 51 is disposed slidably in the direction of arrow a corresponding to the setup direction of the pinch rollers 7 and 8 and the magnetic head 9. The head base 51 is constantly slidably biased to the return direction (of arrow b) by spring 53 stretched between it and a pin 52 provided upright on the chassis 1. An engaging hole 54 is formed through a part of the head base 51, and an engaging projection 55 protrusively provided on the rear side of the head arm 15 enters in the engaging hole 54 through a through-hole 56 formed on the chassis 1.

To the head base 51, a selector arm 57 is slidably attached in the lateral direction or in the direction perpendicular to the sliding direction of the head base 51 (in the direction of arrows c and d, as shown in FIG. 21), and the left and right end portions of the selector arm 57 are both perpendicularly bent toward the front side of the chassis 1 to form engaging pieces 57a and 57b, which engaging pieces 57a, 57b are corresponding to the pinch roller arms 11 and 12 through through-holes 58a and 58b formed through the chassis 1, respectively. The selector arm 57 is slid in cooperation with swing of the first switch lever 36. That is, between the first switch lever 36 and the head base 51, conversion arm 59 is pivotally mounted on the chassis 1 by a pivot 60, and one end 59a of which is engaged with an engaging recess 61 formed in the first switch lever 36 and the other end 59b of which is engaged with an engaging recess 62 formed in the selector arm 57, whereby the swing movement of the first switch lever 36 is transformed to the slide movement of the selector arm 57 through the conversion arm 59.

In addition, a projecting piece 63 is vertically formed in a part of the head base 51, and the projecting piece 63 is projecting to the upper side of the circuit board 22 through a hole 64 formed through the circuit board 22. A switch 65 is provided on the upper side of the circuit board 22 correspondingly to the projecting piece 63, and in a setup condition by sliding of the head base 51, a switch 65 is pressed by the projecting piece 63 to be turned ON.

Figure 8:
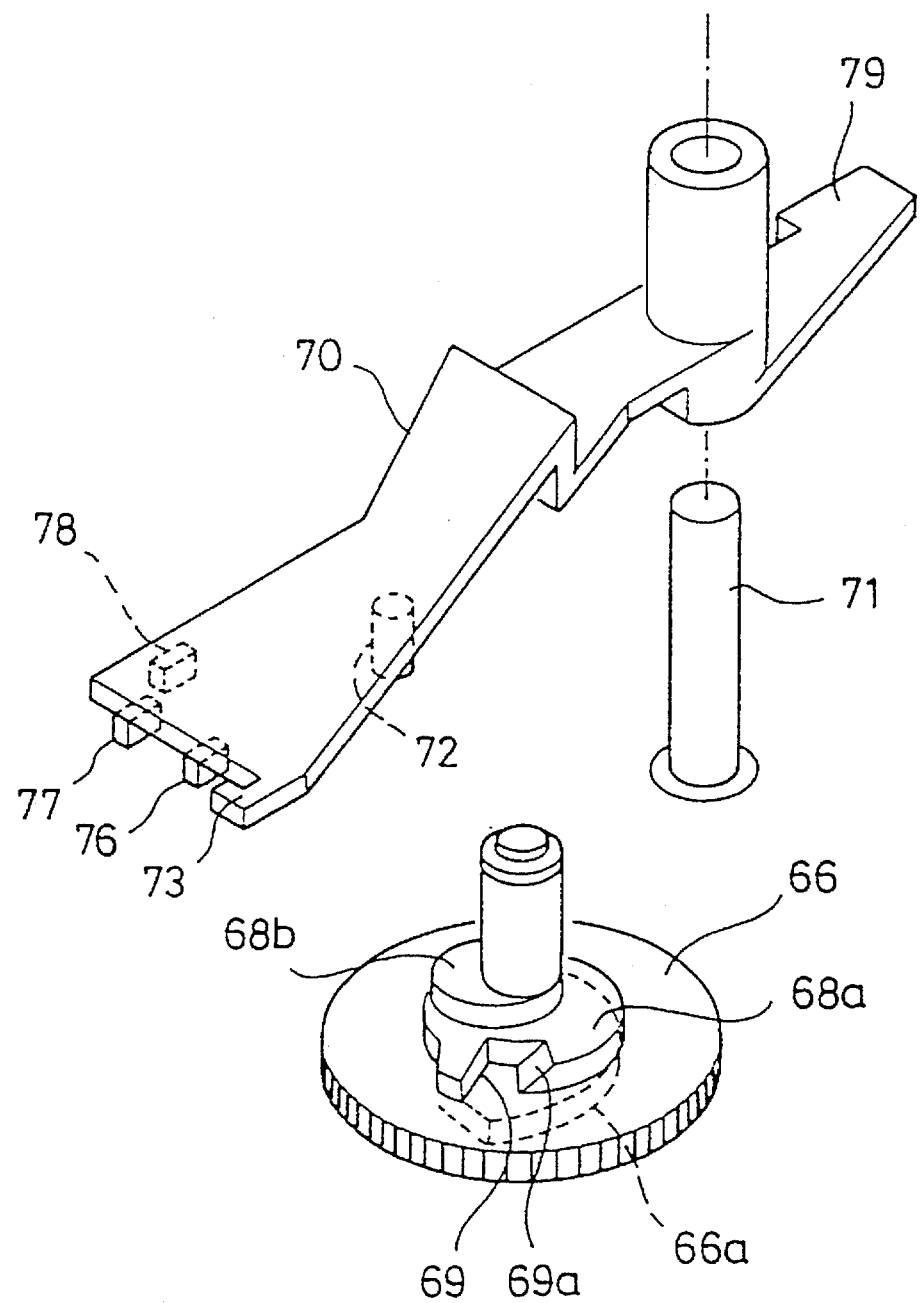
FIG. 8 is a perspective view of a setup cam and a set lever.

The head base 51 is subjected to a setup operation by rotation of the setup cam 66 against the force of spring 53. The setup cam 66 is rotatively driven by mesh of the second slide gear 27 with the transmission gear 67 upon forward rotation of the motor 16, as will be described later on, and a cam face 66a is formed on the underside of the setup cam 66, and the edge portion of a window hole 51a formed through the head base 51 abuts on the cam face 66a by the biasing force of spring 53. On the upper side of the setup cam 66, a first projecting step 68a is formed which is substantially concentric around the central axis of the rotation of setup cam 66, as seen from FIG. 8, and a non-concentric second projecting step 68b partially having the same peripheral surface as the first projecting step 68a is formed on the upper surface of the first projecting-step 68a.

In the first projecting step 68a, an engaging recess 69 with which the engaging pin of a set lever to be described later is engaged upon the setup of the head base 51 is cut out and formed, and contiguously with the engaging recess 69, an engaging recess 69a declining in the rotation direction of the setup cam 66 is formed.

Further, a set lever 70 is disposed in the vicinity of the setup cam 66. The set lever 70 is fitted over and supported by a shaft stem 71 provided upright on the chassis 1 swingably about the stem and movably in the axial direction thereof, as seen from FIG. 8. On the underside of one end of the set lever 70, an engaging pin 72 is protrusively provided correspondingly to the setup cam 66. The set lever 70 is biased by the force of a spring 75 stretched between a hook 73 formed at one end thereof and a pin 74 provided upright on the chassis 1 so that the engaging pin 72 constantly abuts on the peripheral surface of the first projecting step 68a of the setup cam 66. On the underside of one end of the set lever 70, a first engaging projection 76 is protrusively provided which abuts on and engages with the engaging projection 24a formed at the tip end of the first swing arm 24, as will be described later on, and a second engaging projection 77 and a third engaging projection 78 are protrusively provided which abut on and engage with the engaging projection 25a formed at the tip end of the second swing arm 25. In addition, on the other end side of the set lever 70, projection 79 protruding toward the mode cam 32 is formed, and the end portion of the second switch lever 37 is extendedly formed so as to correspond to the projection 79, whereby the terminal portion 80 of the end portion presses projection 79 upon REW and FF to cause the set lever 70 to swing against the force of spring 75.

The tape drive unit of this example having the above construction will be described in detail below.

As the basic operation of the unit of this example, each operation mode of FWD, REV, FF or REW is set by the reverse rotation of the motor 16, and the tape driving corresponding to each operation mode is performed by the forward rotation of the motor 16.

The operation of each portion will now be described in detail.

a. Driving of reel shafts

Figure 9:
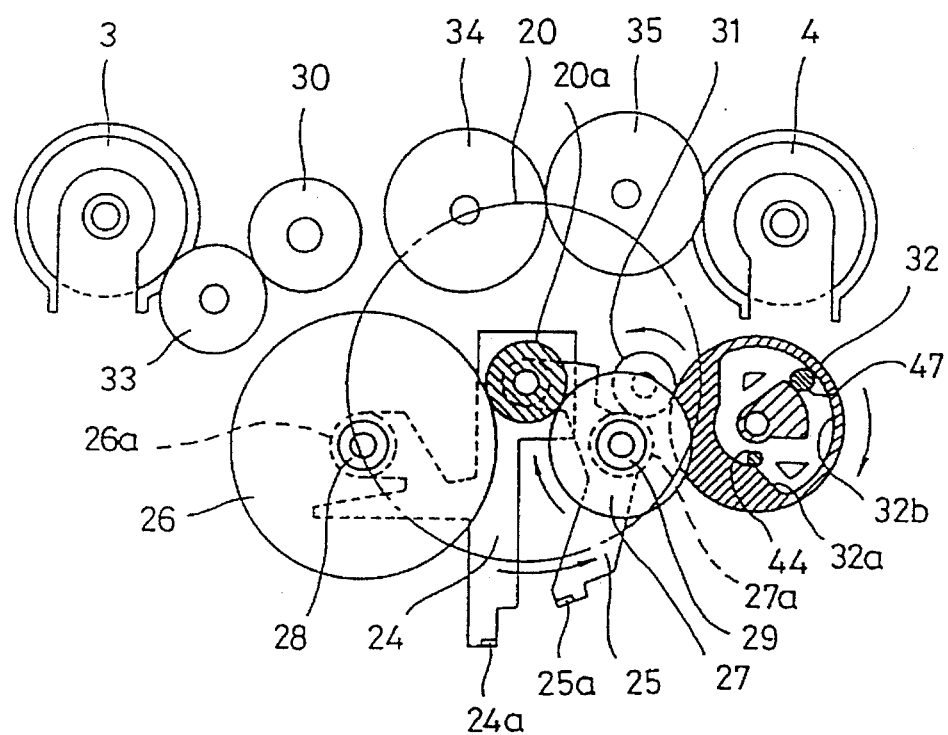
FIG. 9 is an explanatory view of the driving of the mode cam.

In the tape drive unit of this example, the motor 16 is first rotated reversely if the operation button for any of FWD, REv, FF and REW is pressed. When the motor 16 is rotated in the reverse direction, the main pulley 20 is rotated counterclockwise in the figure. When the main pulley 20 is thus rotated counterclockwise, as shown in FIG. 9, the first and second slide gears 26 and 27 move in the same direction as the rotational direction of the main pulley 20 by the friction for the main pulley 20, and as a result the small-diameter gear 27a of the second slide gear 27 meshes with the transmission gear 31 to rotate the mode cam 32 clockwise. The rotation of the mode cam 32 actuates the first and second switch levers 36 and 37, and the mode switching of FWD/FF and REV/REW is performed by the first switch lever 36, while the mode switching of FWD/REV and FF/REW is performed by the second switch lever 37.

Figure 10A:
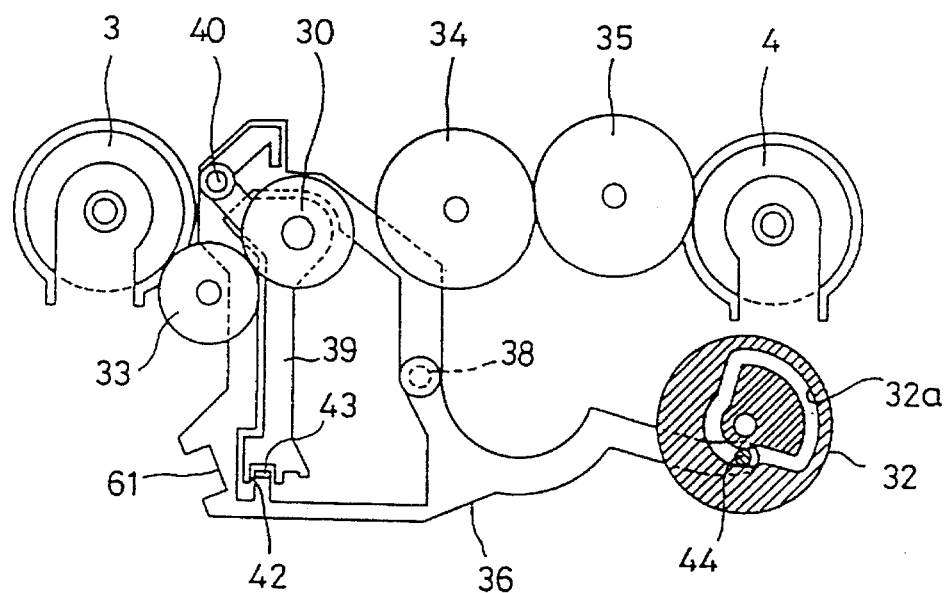
FIG. 10A is an explanatory view of the mode setting operation of FWD/FF and REV/REW of the reel shafts, with the FWD/FF mode being shown.
Figure 10B:
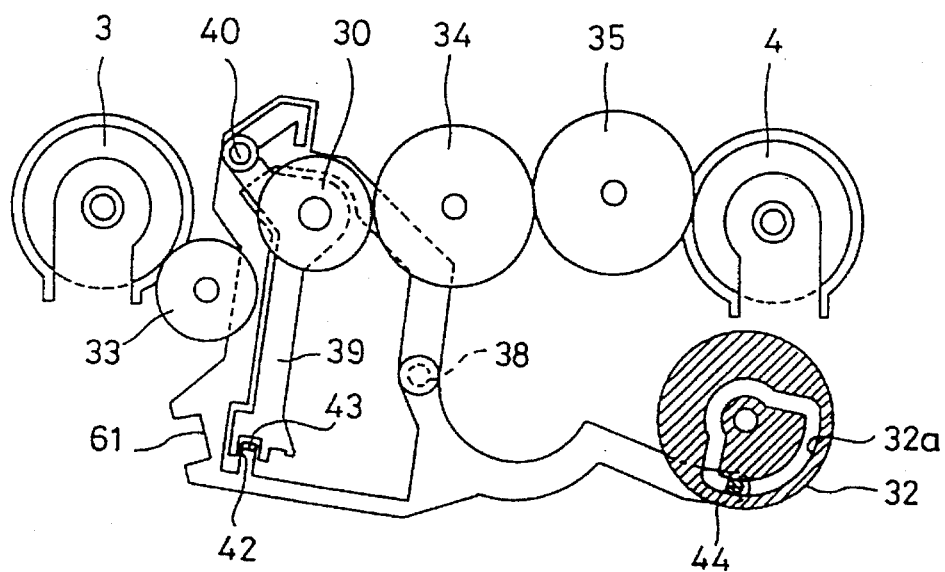
FIG. 10B is an explanatory view of the mode setting operation of FWD/FF and REV/REW of the reel shafts, with the REV/REW mode being shown.

First, the mode switching operation of FWD/REV and FF/REW will be described (FIG. 10).

By the movement of the engaging pin 44 along the first cam groove 32a by the rotation of the mode cam 32, the first switch lever 36 is made to pivot on the pivot 38, and as a result, the switch gear 30 is meshed with either the transmission gear 33 on the take-up reel shaft 3 side or the transmission gear 34 on the supply reel shaft 4 side. Engagement of the switch gear 30 with the transmission gear 34 on the take-up reel shaft 3 side (FIG. 10A) provides a FWD/FF mode, and engagement of the switch gear 30 with the transmission gear 34 on the supply reel shaft 4 side (FIG. 10B) provides a REV/REW mode.

Figure 11A:
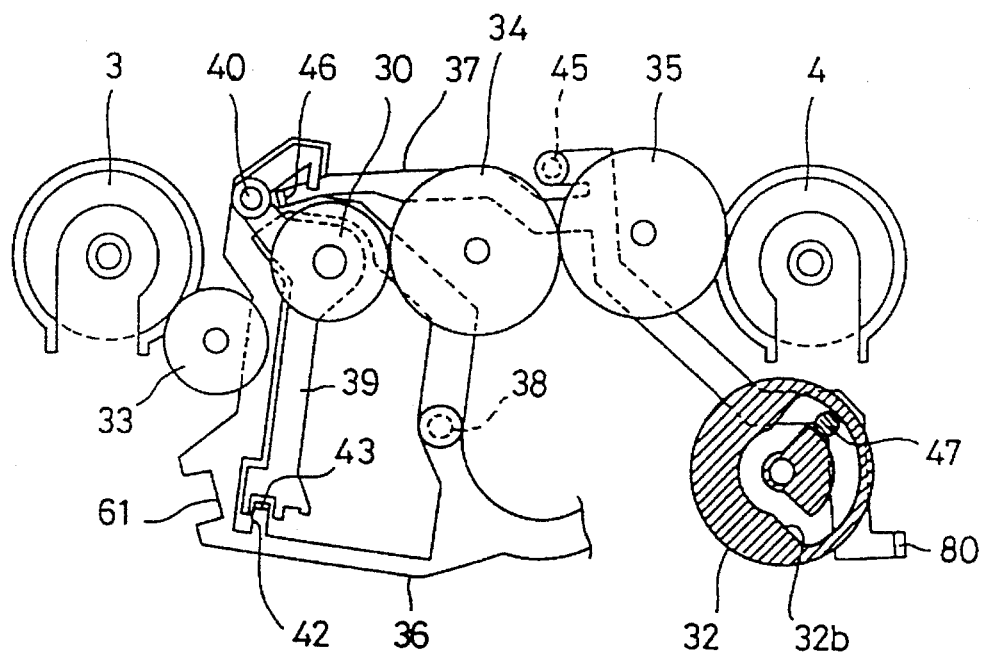
FIG. 11A is an explanatory view of the mode setting operation of FWD/REV and FF/REW of the reel shafts, with the FWD/REV mode being shown.

Now, the mode switching operation of FWD/REV and FF/REW will be described (FIG. 11).

Figure 11B:
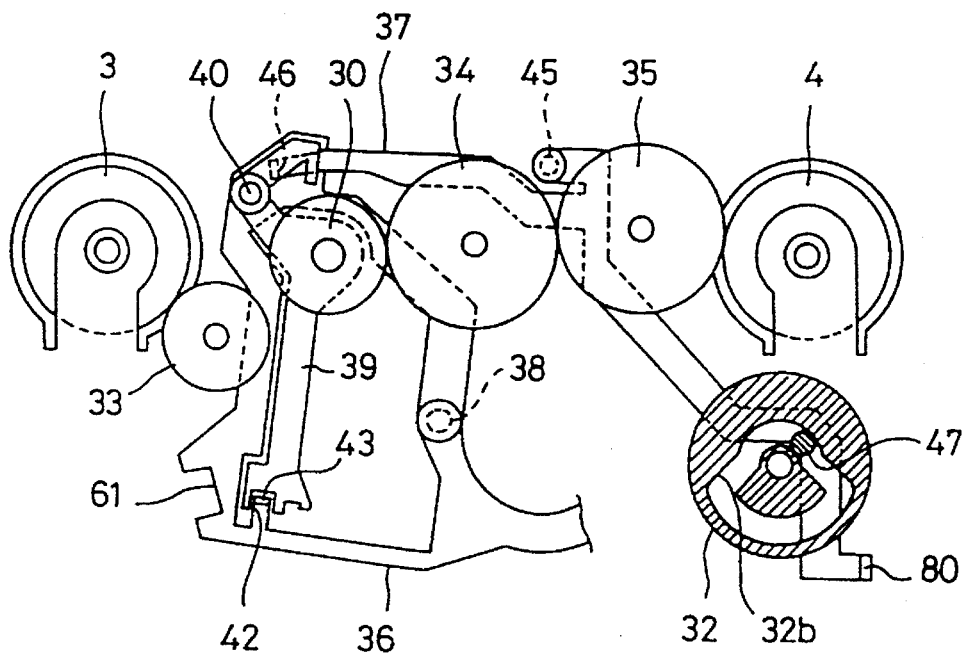
FIG. 11B is an explanatory view of the mode setting operation of FWD/REV and FF/REW of the reel shafts, with the FF/REW mode being shown.

By the movement of the engaging pin 47 along the second cam groove 32b by the rotation of the mode cam 32, the second switch lever 37 is made to pivot on the pivot 45, whereby the switch gear 30 is moved up or down. That is, if the second switch lever 37 is made to swing and the wedge-shaped projecting piece 46 on the end portion of the second switch lever 37 enters under the lift lever 39, the projecting piece 46 pushes up the lift lever 39 against the force of the spring 41 thereby causing the switch gear 30 to rise into the high position, and if the projecting piece 46 of the second switch lever 37 comes out from under the lift lever 39, the lift lever 39 is pressed down by the force of spring 41 thereby causing the switch gear 30 to fall into the low position. A FWD/REV mode is provided when the projecting piece 46 of the second switch lever 37 is out from under the lift lever 39 and the switch gear 30 has fallen into the low position (FIG. 11A), and a FF/REW mode is provided when the lift lever 39 is pushed up by the projecting piece 46 of the second switch lever 37 and the switch gear 30 has risen into the high position (FIG. 11B).

That is, the FWD mode occurs when the switch gear 30 has fallen into the low position and meshes with the transmission gear 33 on the take-up reel shaft 3 side, the REV mode occurs when the switch gear 30 has fallen into the low position and meshes with the transmission gear 34 on the supply reel shaft 4 side, the REW mode occurs when the switch gear 30 has risen into the high position and meshes with the transmission gear 34 on the supply reel shaft 4 side, and the FF mode occurs when the switch gear 30 has risen into the high position and meshes with the transmission gear 33 on the take-up reel shaft 3 side. That is, in the unit of this example, the respective modes of FWD, REV, REW and FF are continuously switched by the clockwise rotation of the mode cam 32, and detection of their positions is performed by the electrical contact described above.

When the mode position corresponding to the depressed operation button of the respective operation buttons for FWD, REV, FF and REW is detected, according to its electrical contact signal, the motor 16 immediately switches to rotation in the direction opposite to the above, or in other words the forward direction. When the motor 16 is rotated in the forward direction, the main pulley 20 is rotated in the clockwise direction. When the main pulley 20 is rotated clockwise in this way, the first and second slide gears 26 and 27 move in the same direction as the rotational direction of the main pulley 20 by the friction of the main pulley 20, and as a result, the small-diameter gear 27a of the second slide gear 27 comes out of the transmission gear 31 to stop the rotation of the mode cam 32, while the first slide gear 26 meshes with the switch gear 30 to perform the driving of take-up reel shaft 3 or supply reel shaft 4 according to each mode set by the mode cam 32.

Figure 13:
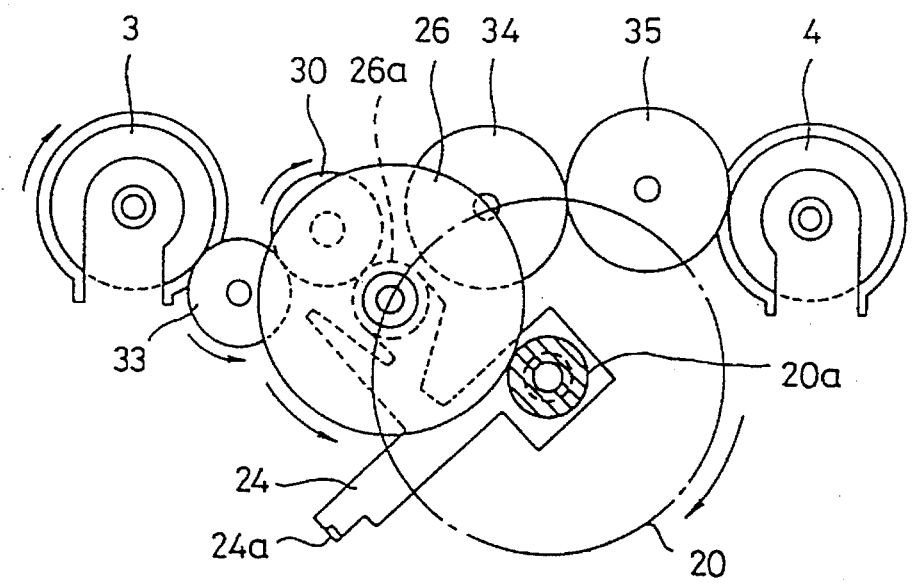
FIG. 13 is an explanatory view of the driving state of the reel shafts upon FWD.
Figure 14:
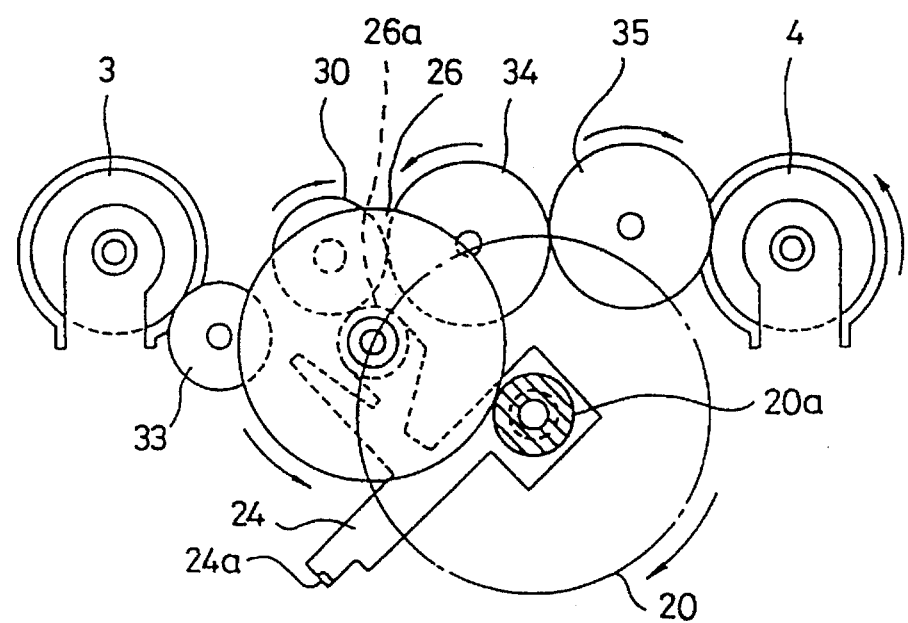
FIG. 14 is an explanatory view of the driving state of the reel shafts upon REV.
Figure 15:
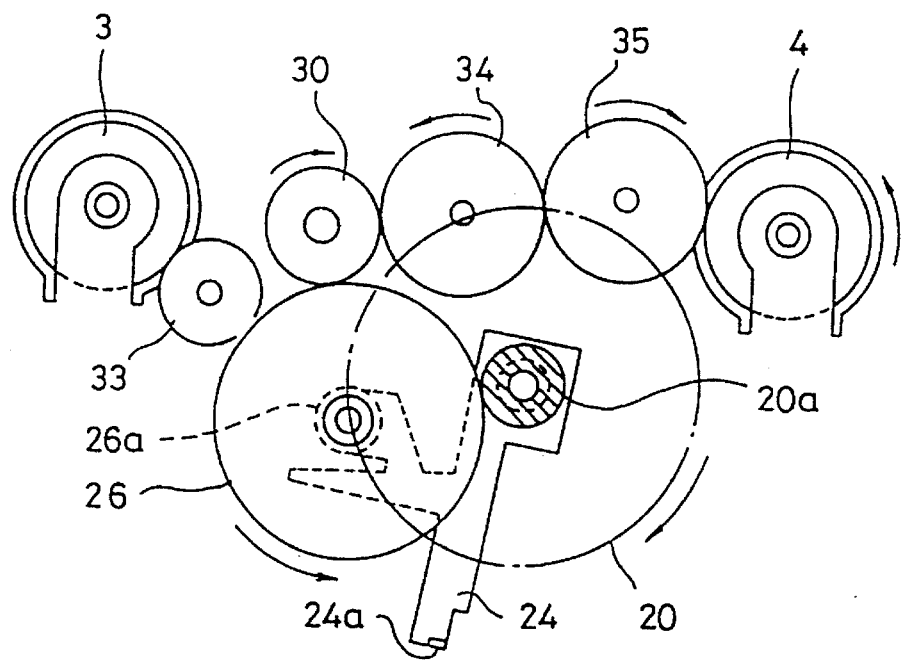
FIG. 15 is an explanatory view of the driving state of the reel shafts upon REW.
Figure 16:
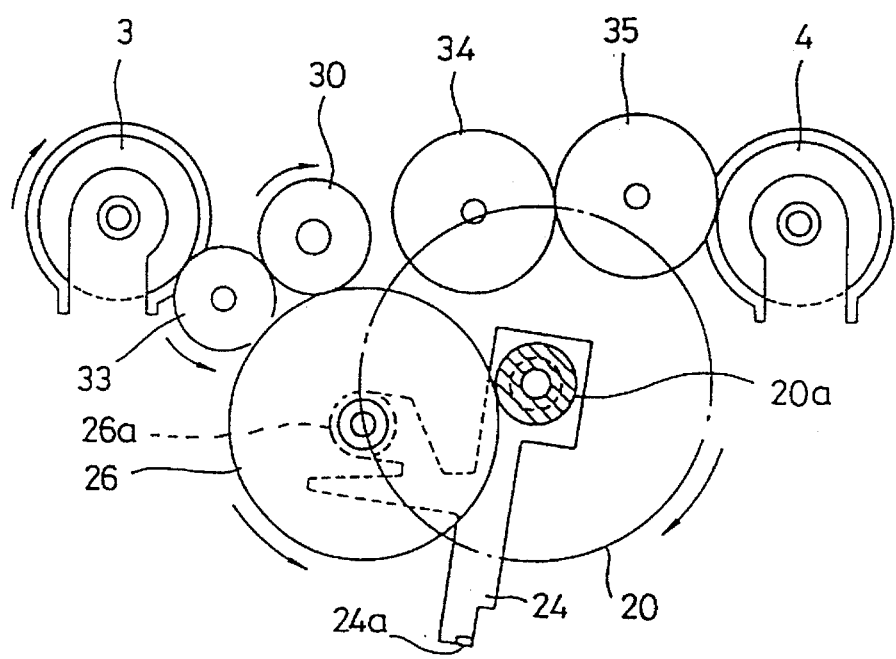
FIG. 16 is an explanatory view of the driving state of the reel shafts upon FF.

That is, when switch gear 30 is meshed with the transmission gear 33 on the take-up reel shaft 3 side in the low position (FWD mode), the small-diameter gear 26a of the first slide gear 26 meshes with the switch gear 30 to drive take-up reel shaft 3 as shown in FIG. 13, and when the switch gear 30 is meshed with the transmission gear 34 on the supply reel shaft 4 side in the low position (REV mode)

the small-diameter gear 26*a* of the first slide gear 26 meshes with the switch gear 30 to drive supply reel shaft 4 as shown in FIG. 14. Further, when the switch gear 30 is meshed with the transmission gear 34 on the supply reel shaft 4 side in the high position (REW mode), the large-diameter portion of the first slide gear 26 meshes with the switch gear 30 to drive the supply reel shaft 4 as shown in FIG. 15, and when the switch gear 30 is meshed with the transmission gear 33 on the take-up reel shaft 3 side in the high position (FF mode), the large-diameter portion of the first slide gear 26 meshes with the switch gear 30 to drive the take-up reel shaft 3 as shown in FIG. 16.

Thus, for FWD/REV and REW/FF, the meshing portion of the first slide gear 26 differs according to the difference in the height position of the switch gear 30. That is, the small-diameter gear 26*a* on the underside of the first slide gear 26 meshes with the switch gear 30 upon FWD/REV and the large-diameter portion of the first slide gear 26 meshes with the switch gear 30 upon REW/FF, and consequently the reel shaft 3 or 4 is rotationally driven at high speed upon REW/FF as compared with upon FWD/REV.

Figure 12A:
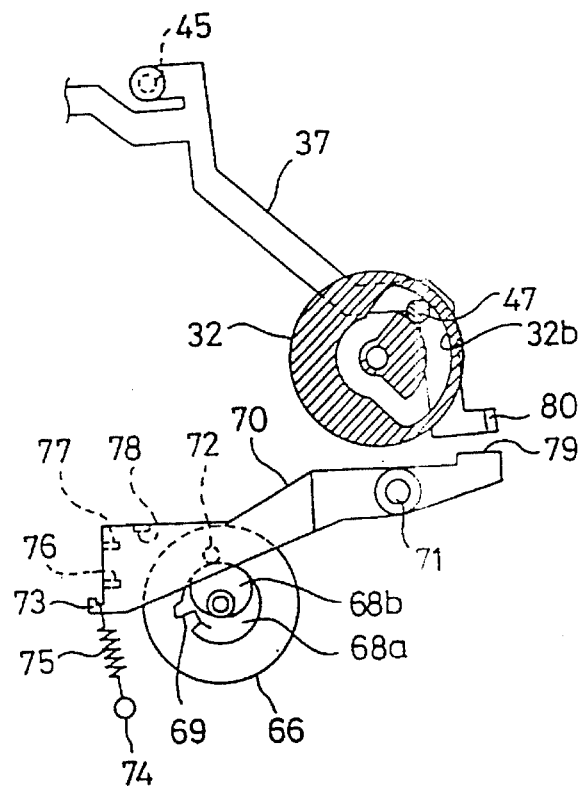
FIG. 12A is an explanatory view of the set lever operation by the driving of the mode cam, with the FWD/REV mode being shown.
Figure 12B:
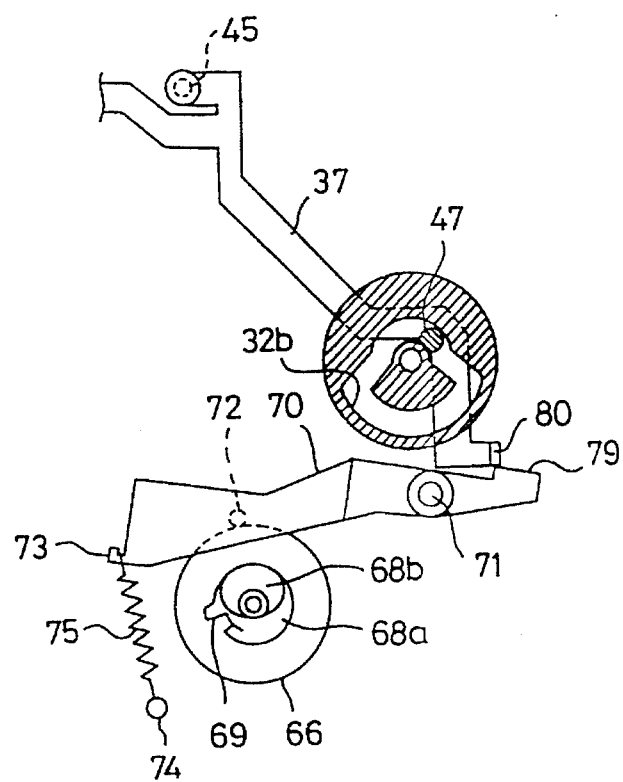
FIG. 12B is an explanatory view of the set lever operation by the driving of the mode cam, with the FF/REW mode being shown.

As described above, in the operation wherein the forward rotation of the motor 16 causes the first slide gear 26 to move to be meshed with the switch gear 30, the first slide gear 26 acts, in a FWD/REV mode, to be meshed with the switch gear 30 after completion of the setup of the head base 51 through the engagement of the engaging projection 24*a* on the tip end of the first swing arm 24 with the first engaging projection 76 of the set lever 70 (this operation will be described in detail later on), whereas the first slide gear 26 is straightly meshed with the switch gear 30 without being affected by the set lever 70 in the REW/FF mode. That is, in the REW/FF mode, as shown in FIG. 12B, the rotation of the mode cam 32 causes a terminal portion 80 of the second switch lever 37 to press the projection 79 of the set lever 70, whereby the set lever 70 is made to swing against the force of spring 75. As a result, in the movement of the first slide gear 26, the engaging projection 24*a* of the first swing arm 24 does not engage with the first engaging projection 76 of the set lever 70, and accordingly the first slide gear 26 smoothly moves to the switch gear 30 side without any obstruction and meshes therewith.

b. Setup operation of head base

The setup operation of head base 51 in a FWD/REV mode will be described below.

Figure 17:
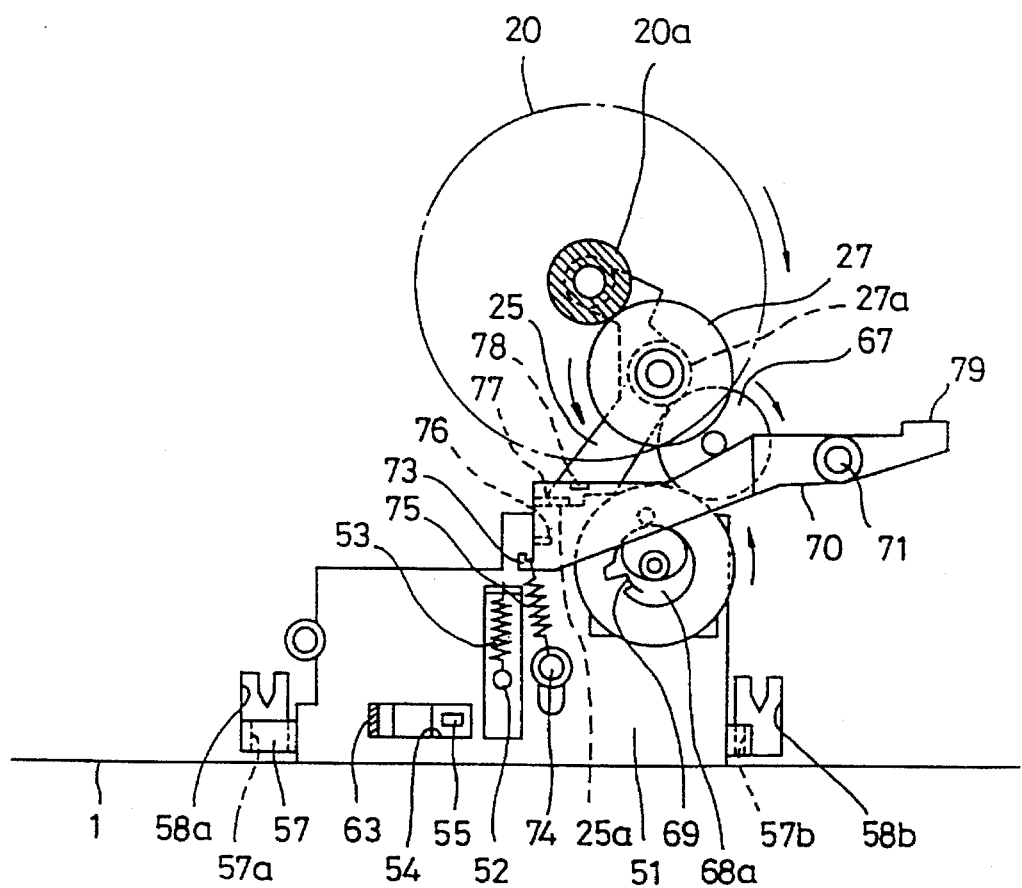
FIG. 17 is an explanatory view of the setup operation of the head base.

As previously described, when the motor 16 is rotated in the forward direction after the completion of the mode setting and the main pulley 20 is rotated clockwise, the second slide gear 27 moves to the same direction as the rotational direction of the main pulley 20 by the friction between the main pulley 20, and as a result the small-diameter gear 27*a* of the second slide gear 27 comes out of the transmission gear 31 of the mode cam 32 and meshes with the transmission gear 67 of the setup cam 66. At that time, as apparent from FIG. 17, the engaging projection 25*a* on the tip end of the second swing arm 25 is made to abut on and meshes with the second engaging projection 77 of the set lever 70, thereby maintaining the meshing state of the small-diameter gear 27*a* of the second slide gear 27 with the transmission gear 67. Thus, the rotation of the main pulley 20 is transmitted to the setup cam 66, and hence the setup cam 66 is rotationally driven counterclockwise, and the head base 51 is slid by the rotation of the setup cam 66 to perform the setup of the magnetic head 9 (and pinch roller 7 or 8, as will be described later).

Figure 18A:
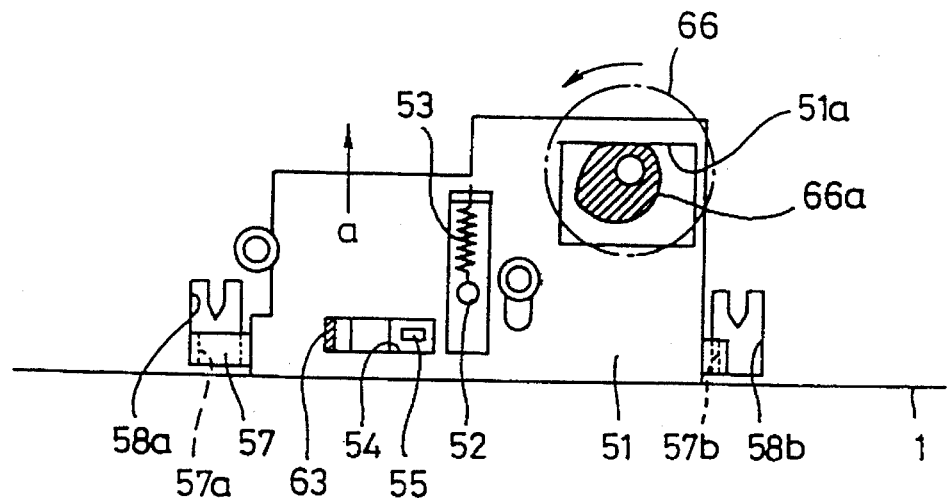
FIG. 18A is an explanatory view of the head base sliding by the driving of the setup cam, with the head base shown in the FF/REW/STOP mode.
Figure 18B:
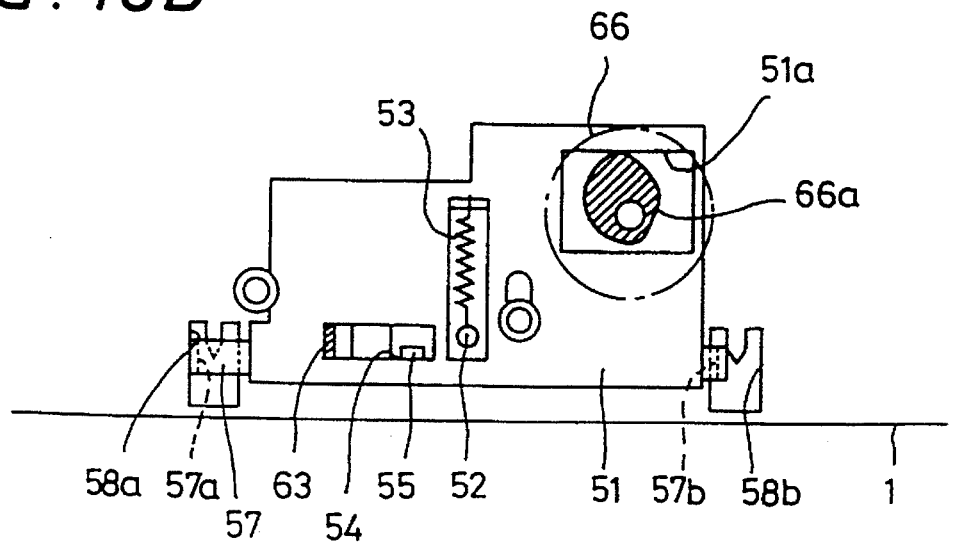
FIG. 18B is an explanatory view of the head base sliding by the driving of the setup cam, with the head base shown in the FWD/REV mode.

That is, when the setup cam 66 is rotated counterclockwise, the cam face 66*a* of the setup cam 66 continuously presses the edge of the window hole 51*a* of the head base 51, as shown in FIG. 18, whereby the head base 51 is slid to the direction of arrow a against the force of spring 53. In addition, in the REW/FF mode, since the set lever 70 is pressed and swung by the terminal portion 80 of the second switch lever 37 as described above, the engaging projection 25*a* of the second swing arm 25 does not engage with the second engaging projection 77 of the set lever 70, and thus the meshing state of the small-diameter gear 27*a* of the second slide gear 27 with the transmission gear 67 is not maintained so that the head base 51 does not move.

When the head base 51 is slid against the force of the spring 53 as described above, the edge of its engaging hole 54 presses the engaging projection 55 of the head arm 15, whereby the head arm 15 is swung to press the magnetic head 9 against the tape and the selector arm 57 presses and swings the pinch roller arm 11 or 12, by which the pinch roller 7 or 8 is pressed in contact with the capstan 5 or 6. The setup operation of the pinch roller will be described in detail later. The sliding of the head base 51 causes the projecting piece 63 to press the switch 65 to turn the switch 65 ON. The function of the switch 65 will also be described later.

Figure 19:
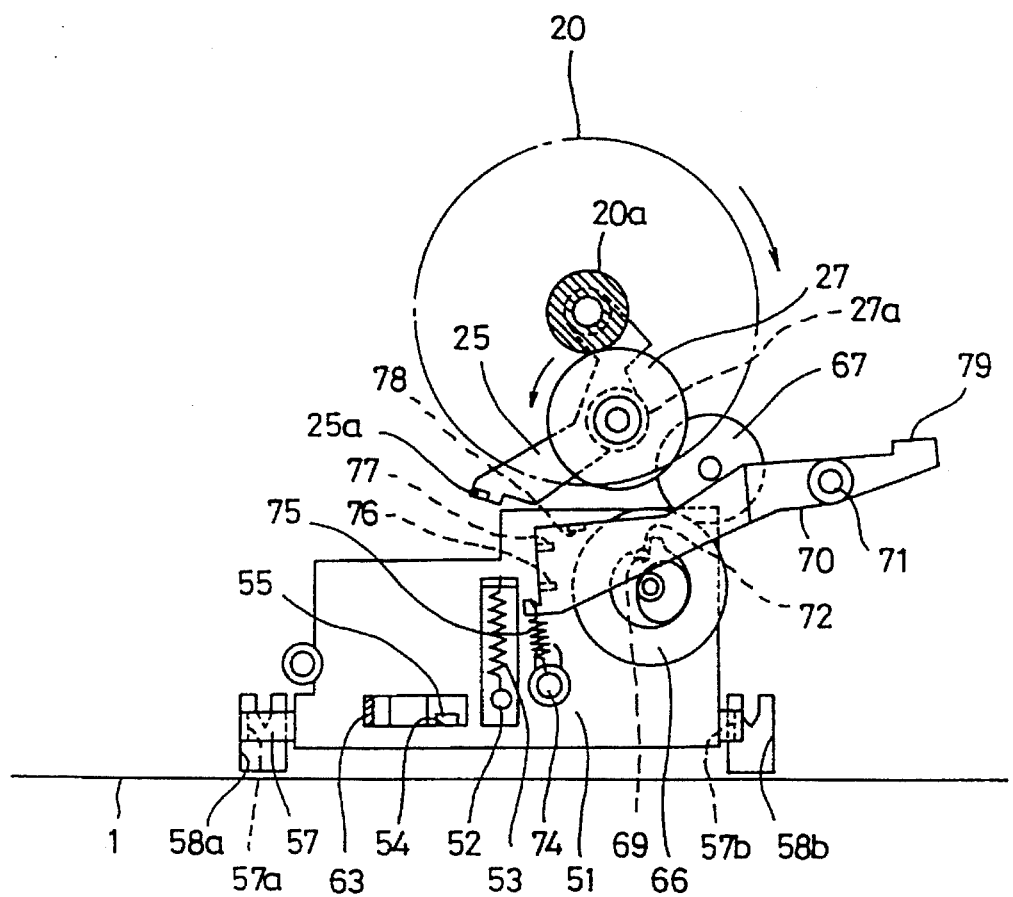
FIG. 19 is an explanatory view of completion of the head base setup.

When the head base 51 is thus completely set up, the engaging pin 72 of the set lever 70 is engaged with the engaging recess 69 of the setup cam 66 by the force of the spring 75 as shown in FIG. 19, whereby the setup cam 66 is locked from further rotation at that position, and accordingly the head base 51 is fixed and maintained in this setup state. Concurrently therewith, the set lever 70 is made to swing a little by the engagement of the engaging pin 72 with the engaging recess 69 of the setup cam 66, which causes the second engaging projection 77 of the set lever 70 to shift relative to the engaging projection 25*a* of the second swing arm 25 thereby to release the engagement between the two, and as a result, the meshing between the small-diameter gear 27*a* of the second slide gear 27 and the transmission gear 67 is released to stop the rotation of the setup cam 66.

Figure 20A:
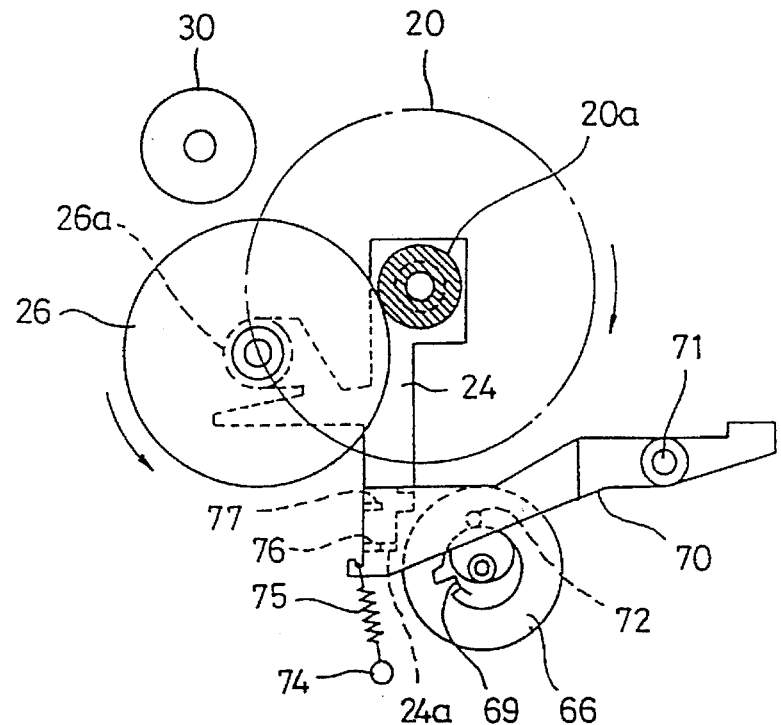
FIG. 20A is an explanatory view of an operation by which the reel shafts are driven after completion of the head base setup, showing the first swing arm being restrained by the set lever.
Figure 20B:
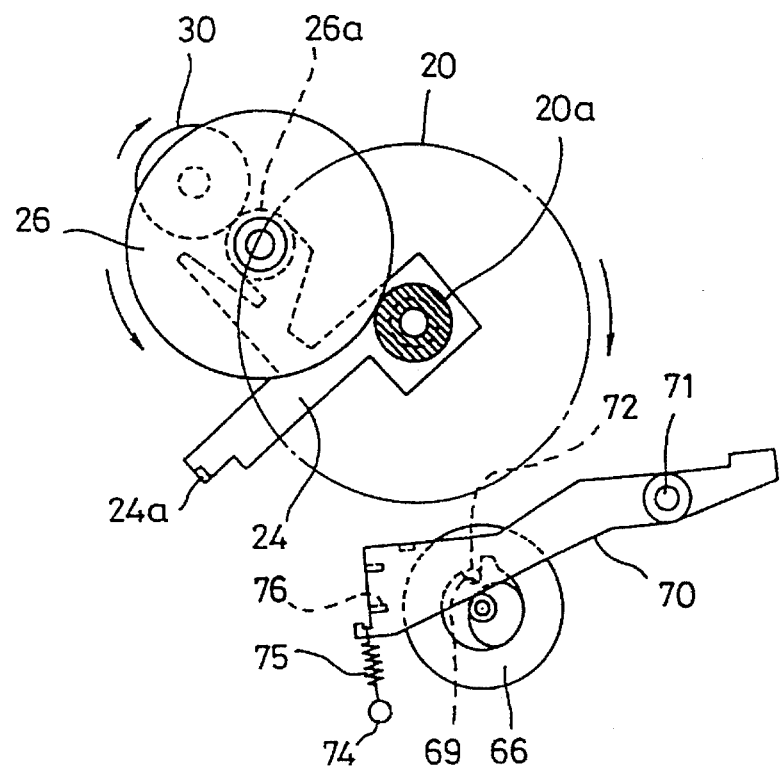
FIG. 20B is an explanatory view of an operation by which the reel shafts are driven after completion of the head base setup, showing the first swing arm being released by the set lever.

The unit of this example is constructed such that the reel shaft 3 or 4 is not driven until the setup operation of the head base 51 is completed. That is, when the motor 16 is forwardly rotated for switching to the FWD/REV operation of the reel shaft after the completion of the mode setting operation by the reverse rotation of the motor 16, the engaging projection 24*a* of the first swing arm 24 is made to abut on and engage with the first engaging projection 76 of the set lever 70, as shown in FIG. 20A. If the head base 51 has not yet set up, then the first slide gear 26 is prevented from moving toward the switch gear 30. In other words, the first slide gear 26 has not yet been meshed with the switch gear 30 at this stage, and thus the reel shaft 3 or 4 is not driven. Then, when the head base 51 is set up as described above and the engaging pin 72 engages with the engaging recess 69 of the setup cam 66 to somewhat swing the set lever 70, the first engaging projection 76 of the set lever 70 shifts with respect to the engaging projection 24*a* of the first swing arm 24, as shown in FIG. 20B, thereby releasing the engaged condition of the two, and as a result, the first slide gear 26 moves in the same direction as the rotational direction of the main pulley 20 by the friction of the main pulley 20 and meshes with the switch gear 30, whereby the reel shaft 3 or 4 is driven. That is, in the unit of this example, upon FWD/REV, the reel shaft 3 or 4 is driven after the head base 51 or magnetic head 9 and the first pinch roller 7 or 8 have been completely set up, which prevents a burden from being imposed on the tape.

c. Switching operation of pinch rollers

Referring to FIGS. 21A–22B, description will now be given on a switching operation for whether the first pinch roller 7 or second pinch roller 8 is to be moved in the setup of the head base 51.

Figure 21A:
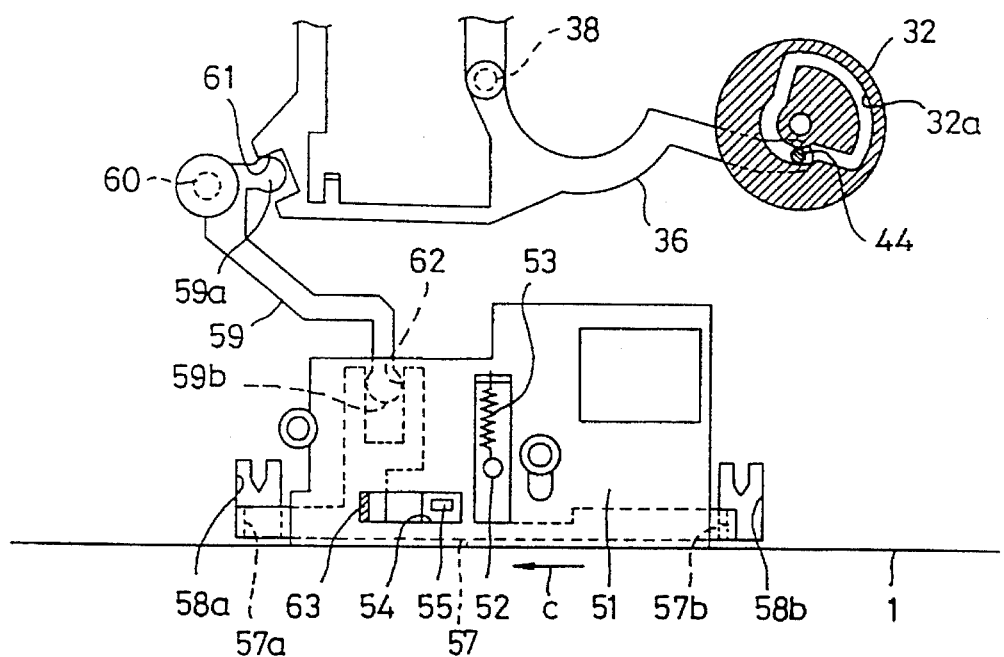
FIG. 21A is an explanatory view of the switching operation of pinch rollers, showing the selector arm shifted to the left prior to being lifted into the FWD mode.
Figure 21B:
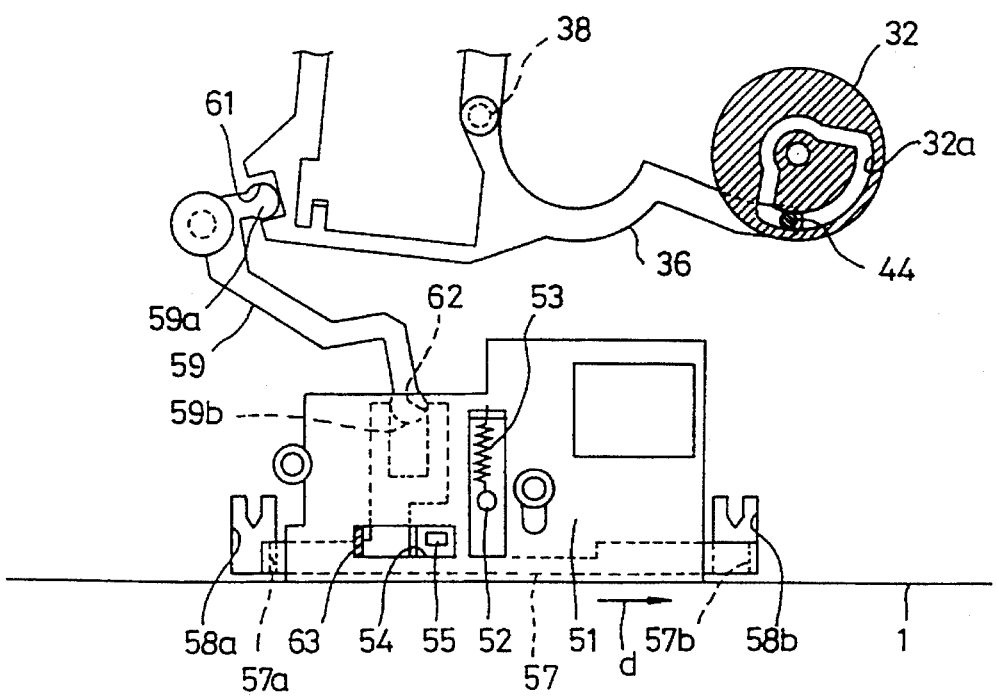
FIG. 21B is an explanatory view of the switching operation of pinch rollers, showing the selector arm shifted to the right prior to being lifted into the REV mode.
Figure 22A:
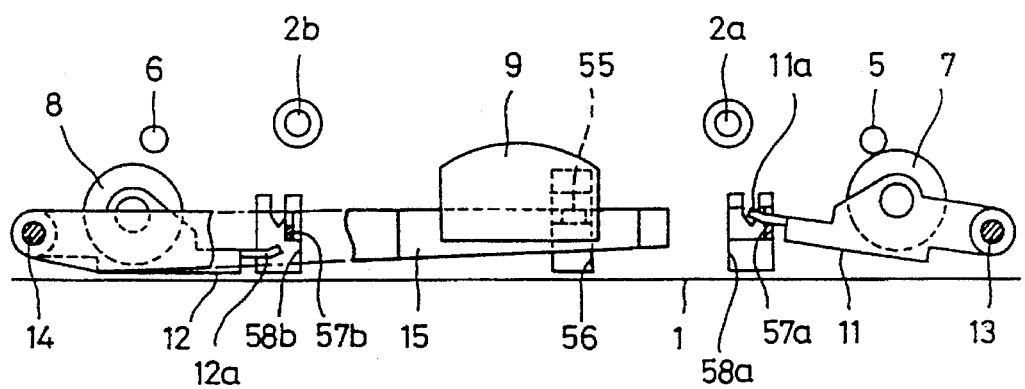
FIG. 22A is an explanatory view of the setup operations of the magnetic head and pinch rollers which are shown in the FWD mode.
Figure 22B:
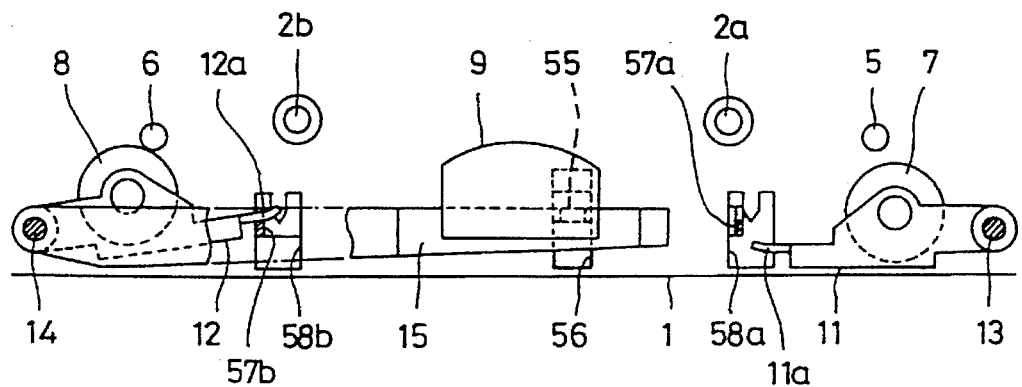
FIG. 22B is an explanatory view of the setup operations of the magnetic head and pinch rollers which are shown in the REV mode.

The switching operation is performed in a ganged relation to the rotation of the first switch lever 36 by the rotation of the mode cam 32. That is, when the mode cam 32 is rotated by the reverse rotation of the motor 16 to cause the first switch lever 36 to pivot on the pivot 38, the change-over arm 59 is caused by this to pivot on the pivot 60, and the selector arm 57 on the head base 51 is slid by the pivotal movement of the change-over arm 59. The selector arm 57 in the FWD mode moves to the left as shown in FIG. 21A (in the direction of arrow c), namely, in the direction in which engaging piece 57a is engaged with the tip end engaging portion 11a of the first pinch roller arm 11 as shown in FIG. 1. In the REV mode, selector arm 57 slides to the right as shown in FIG. 21B (in the direction of arrow d), namely, in the direction in which engaging piece 57b is engaged with the tip end engaging portion 12a of the second pinch roller arm 12 as shown in FIG. 1. Then, when the motor 16 is forwardly rotated to set up head base 51, the selector arm 57 moves in unison with the head base 51, and upon FWD, engaging piece 57a presses the tip end engaging portion 11a of the first pinch roller arm 11 to press the first pinch roller 7 in contact with the first capstan 5 (FIG. 22A), while, upon REV, engaging piece 57b presses the tip end engaging portion 12a of the second pinch roller arm 12 to press the second pinch roller 8 in contact with the second capstan 6 (FIG. 22B).

d. Stop operation

Figure 23:
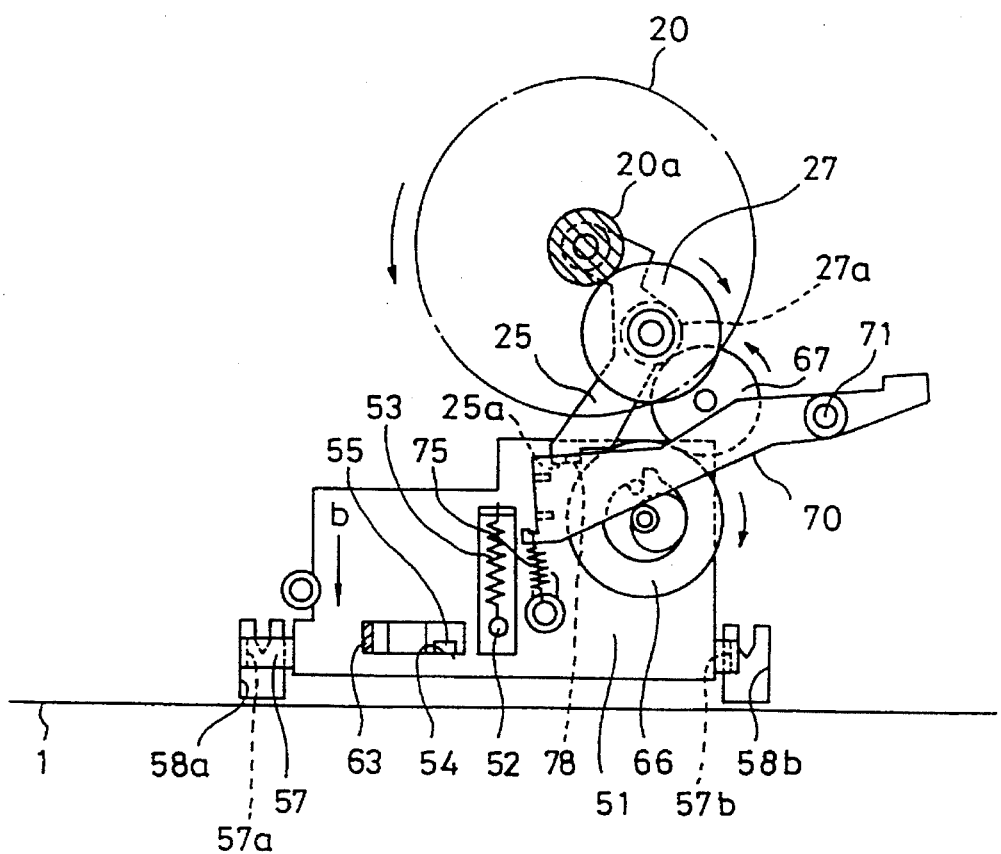
FIG. 23 is an explanatory view of the setup release operation of the head base.

Referring to FIGS. 23–24, description will now be given on the stop operation that occurs after each operation of FWD, REV, FF and REW is performed.

To stop from the FF/REW operation, the motor 16 is immediately stopped by pressing the stop button on the operation console, whereby the driving of the reel shaft 3 or 4 is stopped leaving all of the mechanics as they are.

On the other hand, to stop from the FWD/REV operation, the pressing of the stop button causes the motor 16 to stop after switching from the forward rotation back to the reverse rotation. That is, upon FWD/REV, the head base 51 is set up as described above, and in this condition, the switch 65 is turned ON by the projecting piece 63 of the head base 51, but, if the stop button is pressed with the switch 65 being ON, the motor 16 is set to be rotated in reverse.

When the motor 16 is rotated in reverse in this way and the main pulley 20 is rotated counterclockwise, the first slide gear 26 moves in the same direction as the rotational direction of the main pulley 20 by the friction for the main pulley 20 and disengages from the switch gear 30, whereby the driving of the reel shaft 3 or 4 is stopped.

Simultaneously with this, the second slide gear 27 also moves in the same direction as the rotational direction of the main pulley 20 and its small-diameter gear 27a meshes with the transmission gear 67, thereby to rotate the setup cam 66 clockwise (FIG. 23). At this time, the engaging projection 25a of the second swing arm 25 is made to abut on and engage with the third engaging projection 78, whereby the meshed state between the small-diameter gear 27a of the second slide gear 27 with the transmission gear 67 is maintained.

Figure 24A:
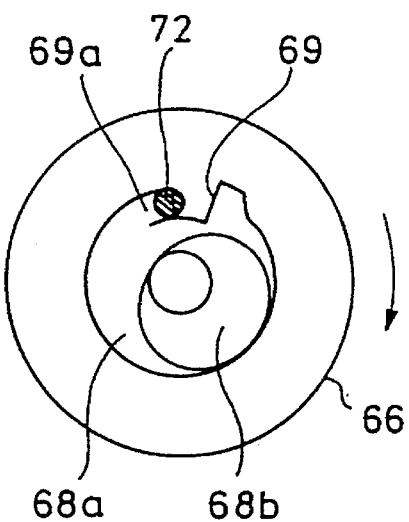
FIG. 24A is an explanatory view of the operation of the setup cam in the setup cam release operation of the head base, showing the engaging pin climbing up onto the ramp face.
Figure 24B:
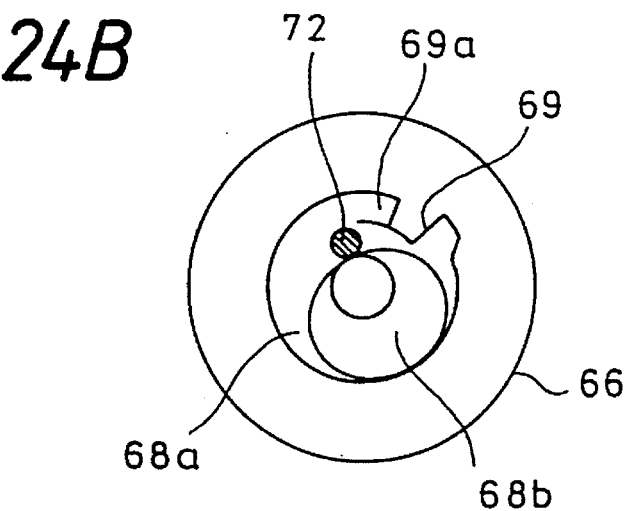
FIG. 24B is an explanatory view of the operation of the setup cam in the setup cam release operation of the head base, showing the engaging pin abutting on the peripheral surface of the second projecting step.
Figure 24C:
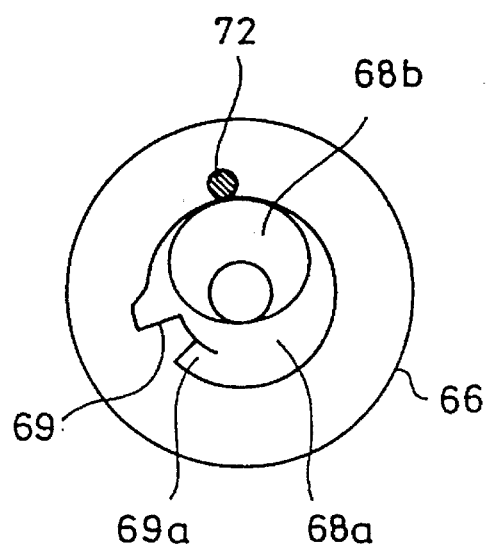
FIG. 24C is an explanatory view of the operation of the setup cam in the setup cam release operation of the head base, showing the engaging pin in the initial position.

When the setup cam 66 is thus rotated clockwise, the engaging pin 72 of the set lever 70 engaged with the engaging recess 69 climbs up onto the ramp face 69a as shown in FIG. 24A, and soon completely disengages from the engaging recess 69 and is made to abut on the peripheral surface of the second projecting step 68b as shown in FIG. 24B. By this operation, the set lever 70 is swung a little. Since such swing motion of the set lever 70 causes its third engaging projection 78 to shift relative to the engaging projection 25a of the second swing arm 25, the engaged state between the two is released, whereby the small-diameter gear 27a of the second slide gear 27 disengages from the transmission gear 67. As a result, the setup cam 66 is freed.

When the setup cam 66 becomes free in this way, the head base 51 is slid by the force of the spring 53 to the direction of arrow b, returning to the initial position, whereby the magnetic head 9 comes apart from the tape and the pinch roller 7 or 8 also disengages from the first capstan 5 or 6. With the return sliding of the head base 51, the setup cam 66 also returns to the initial position shown in FIG. 24C, whereby the set lever 70 returns to the initial state in which engaging pin 72 abuts on the peripheral surface of the first projecting step 68a.

In addition, by the return sliding of the head base 51, the pressing of switch 65 by the projecting piece 63 is released to turn the switch 65 OFF and turn the power source of the motor 16 OFF, whereby all the operations are stopped.

The complete operation of the tape drive unit according to the present invention has now been described.

As apparent from the above description, the tape drive unit according to the present invention has a simple construction in which an operation mode is set by the reverse rotation of the motor 16 and the operation corresponding to the set mode is performed by the forward rotation of the motor 16, without using a plunger or microcomputer as in the prior art.

Although one embodiment of the present invention has been described, the present invention is not intended to be limited to the construction of the embodiment.

Figure 25:
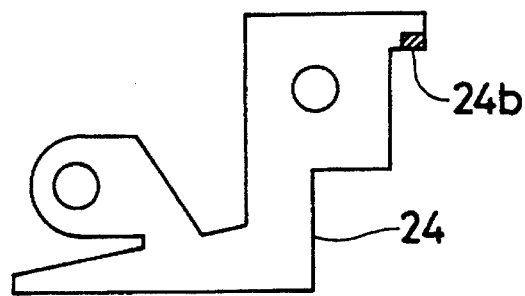
FIG. 25 is a representation showing another example of the shape of a first swing arm.

For instance, first swing arm 24 may have a shape as shown in FIG. 25. That is, the shape example of first swing arm 24 indicates that the engaging projection 24a provided on the distal end in the above described embodiment is eliminated and instead the engaging projection 24b is protrusively provided. The engaging projection 24b is adapted to be made to abut on the second swing arm 25 in the forward rotation, and by employing such shape, the operation by the engaging projection 24a of the first swing arm 24 and the engaging projection 76 of the set lever 70 in the above described embodiment can be performed by the second swing arm 25 and the above engaging projection 24b.

That is, to prevent the reel shafts from being driven until the setup operation of the head base 51 is completed, in the previously described embodiment, the engaging projection 24a of the first swing arm 24 is made to abut on and engage with the engaging projection 76 of the set lever 70 thereby to inhibit the first swing arm 24 from swinging, whereas, if the first swing arm 24 is shaped as shown in FIG. 25, the first swing arm 24 is inhibited from swinging until the completion of the setup of head base 51 since the engaging projection 24b abuts on the second swing arm 25 when the first swing arm 24 attempts to swing, and after the completion of the setup of the head base 51, the second swing arm 25 is disengaged from the engaging projection 77 of the set lever 70 and swung, whereby the first swing arm 24 is made swingable.

By thus shaping the first swing arm 24 as shown in FIG. 25, the part can be made small-sized to reduce the overlapping over the other parts, which is advantageous as a space factor and also excellent in reliability of operation.

Figure 26:
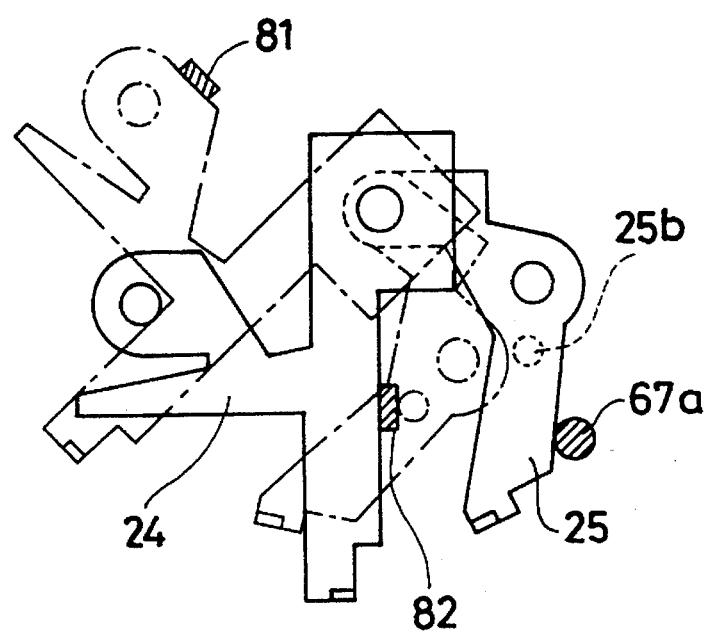
FIG. 26 is a representation showing an example in which a stopper is provided for the first and second swing arms.

In addition, as shown in FIG. 26, in order that the respective gears of the first and second swing arms 24 and 25 successfully mesh with each other and the arm position is restricted after the object is attained, stoppers may be provided.

That is, in FIG. 26, 81 is a stopper which the first swing arm 24 abuts on and engages with in the forward rotation, and 82 is a stopper which the first swing arm 24 abuts on and engages with in the reverse rotation and which the second swing arm 25 abuts on in the forward rotation. In this case, the second swing arm 25 is engaged by abutting of the projection 25b protrusively provided on the underside thereof on the stopper 82. When the second swing arm 25 is reversely rotated, the shaft 67a of the transmission gear 67 functions as a stopper. Both stoppers 81 and 82 are protrusively provided by partially cutting and upwardly bending a portion of the chassis 1.

Further, in the other various portions, various changes and modifications may be made in the scope not departing from the gist of the present invention without being limited to the construction shown in the above embodiment.

As described above, the tape drive unit of the present invention is constructed such that the respective operation modes of forward play, reverse play, fast forward and rewinding are set by the reverse rotation of the motor while the tape driving operation corresponding to the mode thus set is carried out by the forward rotation of the motor, and uses no plunger or microcomputer as in the prior art. Thus, the cost is held down accordingly as compared with the prior art and the unit can be provided at low cost, and in addition there is no fear of troubles due to the malfunction of a plunger or the bug of a microcomputer. Moreover, since the unit of the present invention basically requires no setup timing, it does not malfunction, and thus a reliable operation is achieved, however slow the rotation speed of the motor may be, for instance. In addition, in the unit of the present invention, there is no malfunction since the mode cam mechanically stores the position, and even if power is turned off, battery replacement requires no reset since the mode is stored. Further, since the unit of the present invention is simple in operation, it has various practical effects which were not seen before, such as easy understanding, repair or service.

I claim:

1. A tape drive unit comprising,
   a pair of capstans;
   a pair of reel shafts for driving a magnetic tape;
   a single motor for driving said reel shafts and said capstans, said motor being forwardly and reversely rotatable;
   a magnetic head provided so as to be movable between a first position at which it can record on and/or reproduce from said magnetic tape and a second position at which it does not abut on said magnetic tape;
   a pair of pinch rollers each corresponding to one of said pair of capstans;
   mode setting means driven only by the reverse rotation of said motor for forming the respective modes for setting a tape traveling direction and a tape traveling speed;
   moving means driven only by the forward rotation of said motor for moving said magnetic head according to the mode set by said mode setting means to the first position;
   switch means driven only by the forward rotation of said motor for selectively moving and abutting one of said pair of pinch rollers at one time on the corresponding capstan according to the mode set by said mode setting means; and
   drive means driven only by the forward rotation of said motor for driving said reel shafts according to the mode set by said mode setting means, wherein after the mode is set only by the reverse rotation of said motor, the magnetic head movement, pinch roller switching and reel shaft driving are performed only by the forward rotation of said motor according to said established mode.

2. A tape drive unit according to claim 1, wherein the mode setting means in said tape drive unit further comprises a mode cam member driven only by the reverse rotation of said motor, a first switching mechanism moved by said mode cam member for switching the tape traveling direction, and a second switching mechanism moved by said mode cam member for switching the tape traveling speed.

3. A tape drive unit according to claim 1, wherein the drive means in said tape drive unit further comprises a first transmission mechanism for transmitting the rotational driving force of said motor to either of said pair of reel shafts, and a second transmission mechanism for transmission to the other reel shaft, wherein the rotational driving force of said motor is selectively transmitted to said pair of reel shafts according to the mode set by said mode setting means.

* * * * *